(12) United States Patent
Tominaga et al.

(10) Patent No.: US 9,783,694 B2
(45) Date of Patent: Oct. 10, 2017

(54) IMAGE RECORDING METHOD AND LIQUID SET USED FOR THE METHOD

(71) Applicant: CANON KABUSHIKI KAISHA, Tokyo (JP)

(72) Inventors: Akiko Tominaga, Kawasaki (JP); Takashi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/013,056

(22) Filed: Feb. 2, 2016

(65) Prior Publication Data

US 2016/0230030 A1 Aug. 11, 2016

(30) Foreign Application Priority Data

Feb. 10, 2015 (JP) ................. 2015-024449
Feb. 10, 2015 (JP) ................. 2015-024490

(51) Int. Cl.
| | | |
|---|---|---|
| C09D 11/38 | (2014.01) |
| C09D 11/54 | (2014.01) |
| B41M 5/00 | (2006.01) |
| C09D 11/14 | (2006.01) |
| C09D 11/40 | (2014.01) |

(52) U.S. Cl.
CPC .......... *C09D 11/38* (2013.01); *B41M 5/0017* (2013.01); *C09D 11/14* (2013.01); *C09D 11/40* (2013.01); *C09D 11/54* (2013.01)

(58) Field of Classification Search
CPC ......... C09D 11/54; C09D 11/40; B41J 2/2107
See application file for complete search history.

(56) References Cited

U.S. PATENT DOCUMENTS

| | | | | |
|---|---|---|---|---|
| 6,084,619 | A | * | 7/2000 | Takemoto ............... B41J 2/2114 106/31.72 |
| 6,171,381 | B1 | * | 1/2001 | Yoshimura ............. C09D 11/14 106/31.6 |
| 6,935,732 | B2 | | 8/2005 | Takada et al. |
| 7,276,112 | B2 | | 10/2007 | Tokuda et al. |
| 7,377,631 | B2 | | 5/2008 | Takada et al. |
| 7,402,200 | B2 | | 7/2008 | Imai et al. |
| 7,635,182 | B2 | | 12/2009 | Hakamada et al. |
| 7,883,199 | B2 | | 2/2011 | Hakamada et al. |
| 7,909,448 | B2 | | 3/2011 | Iwata et al. |
| 7,947,762 | B2 | | 5/2011 | Udagawa et al. |
| 8,016,406 | B2 | | 9/2011 | Hakamada et al. |
| 8,217,097 | B2 | | 7/2012 | Udagawa et al. |
| 8,324,293 | B2 | | 12/2012 | Imai et al. |
| 8,362,108 | B2 | | 1/2013 | Imai |

(Continued)

FOREIGN PATENT DOCUMENTS

| | | |
|---|---|---|
| JP | 2004-181803 A | 7/2004 |
| JP | 2010-031267 A | 2/2010 |

*Primary Examiner* — Stephen Meier
*Assistant Examiner* — John P Zimmermann
(74) *Attorney, Agent, or Firm* — Fitzpatrick, Cella, Harper & Scinto

(57) ABSTRACT

An image recording method including an ink application step of applying an ink containing a coloring material, an anionic water-soluble resin, resin particles and an inclusion compound to a recording medium; and a first liquid composition application step of applying a first liquid composition containing at least one of an organic acid and a polyvalent metal ion to the recording medium so as to at least partly overlap with an area where the ink is applied.

14 Claims, 1 Drawing Sheet

(56) References Cited

U.S. PATENT DOCUMENTS

| | | |
|---|---|---|
| 8,367,750 B2 | 2/2013 | Moribe et al. |
| 8,664,296 B2 | 3/2014 | Yanagi et al. |
| 8,741,984 B2 | 6/2014 | Moribe et al. |
| 2004/0254264 A1* | 12/2004 | Suzuki .................. C09D 11/40 523/160 |
| 2007/0097156 A1 | 5/2007 | Udagawa et al. |
| 2010/0003408 A1 | 1/2010 | Yanagi et al. |
| 2011/0141194 A1* | 6/2011 | Imai .................... C09D 11/101 347/45 |
| 2012/0268521 A1* | 10/2012 | Moribe ................ C09D 11/322 347/21 |
| 2014/0307023 A1 | 10/2014 | Moribe et al. |

* cited by examiner

IMAGE RECORDING METHOD AND LIQUID SET USED FOR THE METHOD

BACKGROUND OF THE INVENTION

Field of the Invention

The present invention relates to an image recording method and a liquid set used, for the method.

Description of the Related Art

In conventional image recording methods, two-liquid systems including an ink and a liquid composition containing a reactant that destabilizes the dispersion, state of a pigment in the ink have been studied. Among the two-liquid systems, an image recording method using an ink containing resin particles has been studied (Japanese Patent Application Laid-Open No. 2010-31267). Japanese Patent Application Laid-Open No. 2010-31267 discloses the image recording method using an ink that contains a pigment and resin particles having a structure derived from, a methacrylic acid derivative and using a treatment liquid that causes the ink composition to aggregate, Japanese Patent Application Laid-open No. 2004-181803 discloses an image recording method in which a liquid containing a resin and containing substantially no coloring agent is applied onto a pigment ink image.

SUMMARY OF THE INVENTION

An aspect of the present invention is an image recording method including an ink application step of applying an ink containing a coloring material, an anionic water-soluble resin, resin particles and an inclusion compound to a recording medium and a first liquid composition application step of applying a first liquid composition containing at least one of an organic acid and a polyvalent, metal ion to the recording medium so as to at least partly overlap with an area where the ink is applied (hereinafter called the first invention).

Another aspect of the present invention is a liquid set for image recording, the liquid set including an ink containing a coloring material, an anionic water-soluble resin, resin particles and an inclusion compound, and a liquid composition containing at least one of an organic acid and a polyvalent metal ion (hereinafter called the second invention).

Still another aspect of the present invention is an image recording method including an ink application step of applying an ink containing a coloring material, an anionic water-soluble resin and resin particles to a recording medium and a liquid composition application step of applying a liquid composition containing at least one of an organic acid and a polyvalent metal ion and containing an inclusion compound to the recording medium so as to at least partly overlap with an area where the ink is applied (hereinafter called the third invention).

Another aspect of the present invention is a liquid set for image recording, the liquid set including an ink containing a coloring material and an anionic water-soluble resin, and a liquid composition containing at least one of an organic acid and a polyvalent metal ion and containing an inclusion compound (hereinafter called the fourth invention).

Another aspect of the present invention is an image recording method including an ink application step of applying an ink containing a coloring material to a recording medium, a first liquid composition application step of applying a first liquid composition containing at least one of an organic acid and a polyvalent metal ion to the recording medium so as to at least partly overlap with an area where the ink is applied, and a second liquid composition application step of applying a second liquid composition containing an anionic water-soluble resin and an inclusion compound to the recording medium so as to at least partly overlap with an area where the first liquid composition is applied (hereinafter called the fifth invention).

Another aspect of the present invention is a liquid set for image recording, the liquid set including an ink containing a coloring material, a first liquid composition containing at least one of an organic acid and a polyvalent metal ion, and a second liquid composition containing an anionic water-soluble resin and an inclusion compound (hereinafter called the sixth invention).

According to the configuration of the present invention, image recording methods that can give images having high image quality even when high-speed recording is performed and liquid sets used for the methods can be provided.

Further features of the present invention will become apparent from the following description of exemplary embodiments with reference to the attached drawings.

DESCRIPTION OF THE EMBODIMENTS

Figure 1:
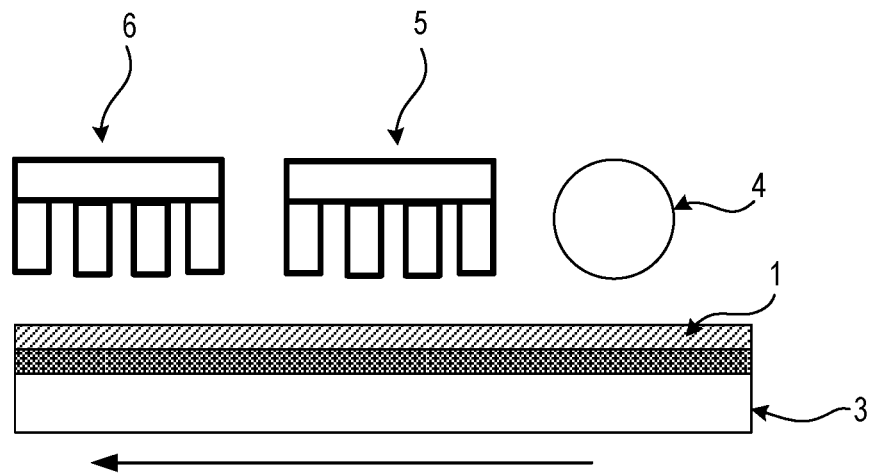
FIG. 1 is a schematic view illustrating an exemplary direct drawing type image recorder.

Preferred embodiments of the present invention will now be described in detail in accordance with the accompanying drawings.

The inventors of the present invention have examined the image recording method that is described in Japanese Patent Application Laid-Open No. 2010-31267 and uses a conventional two-liquid reaction system and have failed to constantly give images having a high level of image quality that has been recently demanded, when high-speed recording is performed. An image recording method of using a three-liquid reaction system in which a liquid composition containing a resin is applied onto the image formed by the two-liquid reaction system described in Japanese Patent Application Laid-Open No. 2004-181803 has also failed to constantly give images having high level of image quality.

An object of the present invention is thus to provide an image recording method that can give images having high image quality even when high-speed recording is performed and to provide a liquid set used for the method.

The present invention will now be described in detail with reference to preferred embodiments.

The inventors of the present invention have found that image recording methods using a conventional two-liquid system fail to constantly give images having a high level of image quality when high-speed recording that has been recently demanded is performed, and have studied the reason for this.

The image recording method using the two-liquid system, is preferably designed so that the reactivity between an ink and a liquid composition becomes high in order to effectively suppress blurring and bleeding. Specifically, a reactant (aggregating component) is preferably added to the liquid, composition so that an anionic water-soluble resin or resin particles aggregate immediately when the ink comes in contact with the liquid composition. However, when the reactivity between the ink and the liquid composition is high, an anionic water-soluble resin is likely to undergo volumetric shrinkage during aggregation of the anionic water-soluble resin. At this time, the aggregates of ink components shift in an area where the ink and the liquid composition have been applied, and this causes the phenomenon in which a pigment is fixed to an area deviating from an intended area on a recording medium (image shift phenomenon).

The inventors of the present invention have studied this phenomenon to find that the image shift phenomenon can be suppressed by adding an inclusion compound to an ink or a liquid composition for accelerating fixation of an ink (hereinafter also called a first liquid composition), thereby successfully establishing a method of adding the inclusion compound to a recording medium to accomplish the present invention.

The image recording method of the present invention includes the following first and second embodiments.

The first embodiment includes the following steps (A1) and (B1).

(A1) An ink application step of applying an ink containing a coloring material, an anionic water-soluble resin, resin particles, an inclusion compound and water to a recording medium (also called step (A1)).

(B1) A first liquid composition application step of applying a first liquid composition containing at least one of an organic acid and a polyvalent metal ion to the recording medium so as to at least partly overlap with an area where the ink is applied (also called step (B1)).

The second embodiment includes the following steps (A2) and (B2).

(A2) An ink application step of applying an ink containing a coloring material, an anionic water-soluble resin and resin particles to a recording medium (also called step (A2)).

(B2) A first liquid composition application step of applying a first liquid composition containing at least one of an organic acid and a polyvalent metal ion and containing an inclusion compound to the recording medium so as to at least partly overlap with an area where the ink is applied (also called step (B2)).

The inventors have also found that the image recording method of a three-liquid system using an ink, a liquid composition for accelerating fixation of the ink, and a resin-containing transparent liquid composition (hereinafter also called a second liquid composition) fails to constantly give images having a high level of image quality when high-speed recording that has been recently demanded is performed, and have studied the reason for this.

The image recording method using the three-liquid system, is preferably designed, so that the reactivity between the ink and the liquid, composition for accelerating fixation of a coloring material becomes high as in the two-liquid system. The resin-containing transparent liquid composition preferably contains a water-soluble resin that forms a film on the image surface to reduce unevenness, in order to impart glossiness to images. However, when the image recording method of the three-liquid system is used to perform high-speed recording (at 1 m/s or more, for example) as above, image cracking is caused, in some cases. The image cracking is a phenomenon in which cracks are generated in an image to cause color skipping, resulting in a reduction in glossiness.

The inventors of the present invention suppose that the image cracking is caused when the image recording method is used through the following mechanism.

When high-speed recording is performed by using the image recording method of the three-liquid system, the respective three liquids are applied with very short time intervals. In such a case, the liquid composition for accelerating fixation of a coloring material reacts not only with the ink but also with an anionic water-soluble resin in the resin-containing transparent liquid composition, and the anionic water-soluble resin undergoes volumetric shrinkage. At this time, the anionic water-soluble resin in the resin-containing transparent liquid composition shrinks to generate cracks in an image. As a result, the glossiness deteriorates to cause image cracking.

To solve the problem of image cracking, when a cationic water-soluble resin or a nonionic water-soluble resin is added to the resin-containing transparent liquid composition, the image cracking can be suppressed, but blurring or bleeding is caused. This is supposed to be because the cationic water-soluble resin or the nonionic water-soluble resin in the transparent liquid containing a resin reduces the reactivity between the ink and the liquid composition for accelerating fixation of a coloring material.

The inventors have thus studied an image recording method to suppress the image cracking and found that the image cracking can be suppressed by adding an inclusion compound into the resin-containing transparent liquid composition, thereby establishing a method of adding the inclusion compound to a recording medium to accomplish the present invention.

The image recording method of the present invention includes the following third embodiments, in which the third embodiment includes the following steps (A3), (B3), and (C3).

(A3) An ink application step of applying an ink containing a coloring material to a recording medium (also called step (A3)).

(B3) A first liquid composition application step of applying a first liquid composition containing at least one of an organic acid and a polyvalent metal ion to the recording medium so as to at least, partly overlap with an area where the ink is applied (also called step (B3)).

(C3) A second liquid composition application step of applying a second liquid composition containing an anionic water-soluble resin and an inclusion compound, to the recording medium so as to at least partly overlap with an area where the first liquid composition is applied, (also called step (C3)).

The mechanism of achieving the effect of the invention will be described below. The inclusion compound in the present invention is a compound functioning as a host molecule, forms a basket-shaped, tunnel-shaped, or layered, molecular-scale space, and can include another molecular species, that is, a guest, molecule, in the space. In the present invention, the inclusion compound is supposed to be able to at least partly include the anionic water-soluble resin as the guest molecule. In the first to fourth inventions, when the ink containing an anionic water-soluble resin comes in contact with the first liquid composition containing a reactant (aggregating component), the anionic water-soluble resin in the ink aggregates while the anionic water-soluble resin is partly included, in the inclusion compound. In the fifth and sixth inventions, when the first liquid composition containing a reactant comes in contact with the second liquid composition containing an anionic water-soluble resin, the anionic water-soluble resin in the second liquid composition, aggregates while the anionic water-soluble resin is partly included in the inclusion compound. At this time, the anionic water-soluble resin aggregates while incorporating the bulky inclusion compound therein, and thus the rate of volumetric shrinkage caused by the aggregation reaction is reduced. The inclusion compound does not react with the organic acid or the polyvalent metal ion, which is the reactant in the first liquid composition, and thus does not undergo volumetric shrinkage.

Through the above mechanism, it is supposed that the immediate aggregation of the ink and the first liquid composition is achieved and the rate of volumetric shrinkage by the anionic water-soluble resin is reduced. On this account, the two-liquid system is supposed to achieve both the suppression of blurring and bleeding and the suppression of the image shift phenomenon. The three-liquid system is supposed to enable the suppression of image cracking and the formation of images having high glossiness.

The above mechanism is merely a supposition and does not limit the present invention.

Embodiments

The means of applying an ink to a recording medium is preferably a means of using a liquid ejecting head such as ink jet recording heads employing an ink jet system in response to recording signals. The ink jet system is preferably a system of applying thermal energy to an ink and ejecting the ink from an ejection orifice of a recording head. The means of applying a first liquid composition to a recording medium is exemplified by liquid ejecting heads and coating units. The coating system used for coating units is exemplified by roller coating, bar coating, and spray coating. The means of applying a second liquid composition to a recording medium is exemplified by liquid ejecting heads and coating units.

In the present invention, "recording" includes recording of characters, patterns, images, and the like with coloring materials onto a recording medium such as glossy paper and plain paper as well as recording of characters, patterns, images, and the like onto an impermeable recording medium such as glass, plastic, film, and rubber.

In the present invention, the order of the ink application step and the liquid composition application steps and the numbers of the respective steps are not particularly limited and can be appropriately set so as to give effects intended in the present invention. For example, in the case of a combination of the step (A1) and the step (B1) in the above-described first embodiment, after the step (A1), the step (B1) may be performed, or after the step (B1), the step (A1) may be performed. The same step may be performed twice or more. For example, the method may be performed in the order of the step (A1), the step (B1), and the step (A1) or in the order of the step (B1), the step (A1), and the step (B1). A method including a process in which the step (B1) is performed and then the step (A1) is performed is preferred, from the viewpoint of the improvement effect of the image quality. The same is applied to a combination of the step (A2) and the step (B2) in the above-described second embodiment.

The order of the step (A3), the step (B3), and the step (C3) in the above-described third embodiment is also not limited to particular orders. The method may be performed in the order of the step (A3), the step (B3), and the step (C3) or may be performed in the order of the step (B3), the step (A3), and the step (C3). The method may also be performed in the order of the step (C3), the step (B3), and the step (A3).

The same step may be performed twice or more. For example, the method may be performed in the order of the step (A3), the step (B3), the step (A3), and the step (C3) or in the order of the step (B3), the step (A3), the step (C3), the step (A3), and the step (B3).

In the present invention, a method including a process in which the step (A3) and the step (B3) are performed and then the step (C3) is performed is preferred from the viewpoint of the improvement effect of the image quality.

The inks, the first liquid compositions, and the second liquid compositions used in the image recording methods of the present invention and in the liquid sets used for the image recording methods will be described below. Hereinafter, "(meth)acrylic acid" represents "acrylic acid, methacrylic acid", and "(meth)acrylate" represents "acrylate, methacrylate".

In the first and second inventions, the ink contains a coloring material, an anionic water-soluble resin, resin particles, and an inclusion compound. The first liquid composition contains at least one of an organic acid and a polyvalent metal ion.

In the third and fourth inventions, the ink contains a coloring material and an anionic water-soluble resin. The first liquid composition contains at least one of an organic acid and a polyvalent metal ion and contains an inclusion compound.

In the fifth and sixth inventions, the ink contains a coloring material. The first liquid composition contains at least one of an organic acid and a polyvalent metal ion. The second liquid composition contains an anionic water-soluble resin and an inclusion compound.

Ink

The type of the ink is exemplified by cyan inks, magenta inks, yellow inks, and black inks.

Coloring Material

The coloring material is not limited to particular coloring materials, and known dyes and pigments are usable, for example. The coloring materials can be used singly or in combination of two or more of them.

Dye

The dye is exemplified by dyes having color phases such as black, cyan, magenta, and yellow. The content of the dye is preferably 1.0% by mass or more and 20.0% by mass or less based on the total mass of the ink.

The dye is not limited to particular dyes, and any known dyes can be used, for example. The dye is exemplified by the acid dyes, the direct dyes, the basic dyes, and the disperse dyes described in the COLOUR INDEX.

Pigment

The pigment is exemplified by pigments having color phases such as black, cyan, magenta, and yellow. Specifically exemplified are carbon black and organic pigments. The content of the pigment is preferably 0.5% by mass or more and 15.0% by mass or less based on the total mass of the ink. The pigments can be used singly or in combination of two or more of them.

The pigment is not limited to particular pigments, and any known pigments can be used, for example. The pigment is exemplified by self-dispersible pigments and resin-dispersion type pigments containing a resin as a dispersant (resin dispersant).

Specific examples of the resin-dispersion type pigment include resin-dispersed pigments containing a resin dispersant, microcapsule pigments in which the surface of pigment particles is covered with a resin, and resin-bonded pigments in which an organic group containing a resin is chemically bonded to the surface of pigment particles.

Examples of the self-dispersible pigment include self-dispersion type pigments in which hydrophilic groups are introduced onto the surface of pigment particles. These resin-dispersion type pigments and self-dispersion type pigments can be used in combination.

The resin used as the dispersant preferably has a hydrophilic moiety and a hydrophobic moiety. Specific examples of such a resin include acrylic resins prepared by polymerization of monomers having a carboxyl group, such as acrylic acid and methacrylic acid; and urethane resins prepared by polymerization of diols having an anionic group, such as dimethyloipropionic acid.

The resin used as the dispersant preferably has an acid value of 50 mg KOH/g or more and 550 mg KOH/g or less. The resin used as the dispersant preferably has a weight average molecular weight (Mw) of 1,000 or more and 50,000 or less, which is determined, by GPC in terms of polystyrene.

The content of the resin dispersant is preferably 0.1% by mass or more and 10.0% by mass or less based on the total mass of the ink. The mass ratio of the content (% by mass) of the resin dispersant relative to the content (% by mass) of the pigment (content of resin dispersant/content of pigment) is preferably 0.1 or more and 5.0 or less.

Resin Particles

In the present invention, "resin particles" mean a resin being present in a state of particles having a particle size and being dispersed in a solvent. In the present invention, the resin particles preferably have a 50% cumulative volume average particle diameter ($D_{50}$) of 10 nm or more, more preferably 10 nm or more and 1,000 nm or less, and even more preferably 100 nm or more and 500 nm or less. In the present invent ion, the $D_{50}$ of resin particles can be determined by the following method. Resin particles are diluted 50-fold (in terms of volume) with pure water, and the prepared sample is subjected to measurement with UPA-EXI50 (manufactured by NIKKISO CO., LTD.) under conditions of a Set-Zero of 30 s, a number of measurements of three times, a measurement time of 180 seconds, and a refractive index of 1.5. The $D_{50}$ of resin particles contained in resin particle dispersions prepared for Examples and Comparative Examples described later were also determined by this method.

The resin particles preferably have a weight average molecular weight of 1,000 or more and 2,000,000 or less, which is determined by gel permeation chromatography (GPC) in terms of polystyrene.

The content of the resin particles is preferably 1.0% by mass or more and 50.0% by mass or less and more preferably 2.0% by mass or more and 40.0% by mass or less based on the total mass of the ink.

The mass ratio of the content (% by mass) of the resin particles in the ink relative to the content (% by mass) of the coloring material in the ink (content of resin particles/content of coloring material) is preferably 0.2 or more and 20 or less.

As the resin particles, any resin particles satisfying the above definition of the resin particles can be used. As the monomer used, for the resin particles, any monomers polymerizable by emulsion polymerization, suspension polymerization, dispersion polymerization, or a similar method can be used. Examples of the resin particles include acrylic resin particles, vinyl acetate resin particles, ester resin particles, ethylene resin particles, urethane resin particles, synthetic rubber particles, vinyl chloride resin particles, vinylidene chloride resin particles, and olefinic resin particles. Among them, acrylic resin particles or urethane resin particles are preferably used.

Examples of the monomer usable for producing the acrylic resin particles include α,β-unsaturated carboxylic acids such as (meth)acrylic acid, maleic acid, crotonic acid, angelic acid, itaconic acid, and fumaric acid and salts thereof; ester compounds of α,β-unsaturated carboxylic acids, such as ethyl(meth)acrylate, methyl(meth)acrylate, butyl(meth)acrylate, methoxyethyl(meth)acrylate, ethoxyethyl(meth)acrylate, diethylene glycol(meth)acrylate, triethylene glycol(meth)acrylate, tetraethylene glycol(meth)acrylate, polyethylene glycol(meth)acrylate, methoxydiethylene glycol(meth)acrylate, raethoxytriethylene glycol(meth)acrylate, methoxytetraethylene glycol(meth)acrylate, methoxypolyethylene glycol(meth)acrylate, cyclohexyl(meth)acrylate, isobornyl(meth)acrylate, N,N-dimethylaminopropyl (meth)acrylate, monobutyl maleate, and dimethyl itaconate; alkyl amide compounds of α,β-unsaturated carboxylic acids, such as (meth)acrylamide, dimethyl(meth)acrylamide, N,N-dimethylethyl(meth)acrylamide, N,N-dimethylpropyl(meth)acrylamide, isopropyl(meth)acrylamide, diethyl(meth)acrylamide, (meth)acryloylmorpholine, maleic acid monoamide, and crotonic acid methylamide; α,β-ethylenioally unsaturated compounds having an aryl group, such as styrene, α-methylstyrene, vinyl phenylacetate, benzyl(meth)acrylate, and 2-phenoxyethyl(meth)acrylate; and ester compounds of polyfunctional alcohols, such as ethylene glycol diacrylate and polypropylene glycol dimethacrylate. Such an acrylic resin may be a homopolymer prepared by polymerization of a single monomer or a copolymer prepared by polymerization of two or more monomers. When the resin particles are those of a copolymer, the copolymer may be a random copolymer or a block copolymer. Specifically preferred are resin particles prepared by polymerization of a hydrophilic monomer and a hydrophobic monomer. Examples of the hydrophilic monomer include α,β-unsaturated carboxylic acids and salts thereof. Examples of the hydrophobic monomer include ester compounds of α,β-unsaturated carboxylic acids and α,β-ethylenically unsaturated compounds having an aryl group.

The urethane resin particles are resin particles synthesized by reacting a polyisocyanate, which is a compound having two or more isocyanate groups, with a polyol compound, which is a compound having two or more hydroxyl groups. In the present invention, any urethane resin particles that are prepared by reacting a known polyisocyanate compound with a known polyol compound can be used as long as the requirements for the resin particles are satisfied.

Examples of the resin particles include resin particles having a single layer structure and resin particles having a multi-layered structure such as a core-shell structure, which are classified in terms of structure. In the present invention, resin particles having a multi-layered structure are preferably used, and resin particles having a core-shell structure are more preferably used. When resin particles have a core-shell structure, the core part and the shell part function in clearly different ways. Resin particles having such a core-shell structure have an advantage of capable of imparting more functions to an ink than those of resin particles having a single layer structure.

Anionic Water-soluble Resin

In the present invention, the anionic water-soluble resin is a water-soluble resin having an anionic group.

In the first to fourth inventions, the ink contains the anionic water-soluble resin. In the fifth and sixth inventions, the second liquid composition contains the anionic water-soluble resin.

Examples of the anionic group include a carboxyl group (—COOH), a sulfonic acid group (—SO$_3$H), and a phosphoric acid group (—PO$_4$H), and one or more of these groups can be used. The water-soluble resin is a resin capable of being dissolved in water at a certain concentration or higher. The water-soluble resin, preferably has a solubility in water at 25° C. of 1% by mass or more, more preferably 5% by mass or more, and even more preferably 10% by mass or more. The water-soluble resin is preferably a resin capable of being dissolved in an aqueous medium. The water-soluble resin may be such a resin that the solubility of the anionic water-soluble resin, increases by addition of a water-soluble organic solvent to an aqueous medium and the resin is dissolved in an aqueous medium.

The anionic water-soluble resin is prepared by a method, of polymerizing a monomer having an anionic group or a method of converting a derivative of an anionic group contained in a resin into the anionic group by a reaction, for example.

The monomer having an anionic group is not limited to particular monomers. As the monomer having a carboxyl group, hydrophilic monomers such as acrylic acid, methacrylic acid, and maleic acid are usable, for example. As the monomer having a sulfonic acid group, styrenesulfonic acid and vinylsulfonic acid are usable, for example. As the monomer having a phosphoric acid group, vinylphosphonic acid is usable, for example.

The anionic water-soluble resin preferably has a hydrophobic group in combination with the anionic group. This is because the reactivity of the anionic water-soluble resin can be controlled by adjusting the ratio of the anionic group to the hydrophobic group. The anionic water-soluble resin having an anionic group and a hydrophobic group can be prepared by copolymerzation of a monomer having a hydrophobic group and a monomer having an anionic group, for example. Examples of the hydrophobic monomer include, but are not necessarily limited to, ester compounds of $\alpha,\beta$-unsaturated carboxylic acids, such as ethyl(meth)acrylate, methyl(meth)acrylate, butyl(meth)acrylate, methoxyethyl(meth)acrylate, ethoxyethyl(meth)acrylate, cyclohexyl (meth)acrylate, isobornyl(meth)acrylate, N,N-dimethylaminopropyl(meth)acrylate, monobutyl maleate, and dimethyl itaconate; $\alpha,\beta$-ethylenically unsaturated compounds having an aryl group, such as benzyl(meth)acrylate and 2-phenoxyethyl(meth)acrylate; and other: known hydrophobic monomers such as styrene and styrene derivatives. The anionic water-soluble resin may be any copolymer including a random copolymer, a block copolymer, and a graft copolymer.

The anionic water-soluble resin, preferably has an acid value of 50 mg KOH/g or more, and more preferably 50 mg KOH/g or more and 550 mg KOH/g or less. The anionic water-soluble resin preferably has a weight average molecular weight of 1,000 or more and 50,000 or less. The anionic water-soluble resin preferably has a polydispersity (ratio of weight average molecular weight Mw to number average molecular weight Mn, Mw/Mn) of 1.0 or more and 3.0 or less. The anionic water-soluble resin is preferably neutralized with a base (KOH, for example).

The content of the anionic water-soluble resin is preferably 0.3% by mass or more and 25.0% by mass or less based on the total mass of the ink.

The anionic water-soluble resin can be contained, in the ink as a dispersant to be used for dispersing the above-mentioned resin-dispersion type pigment.

In the ink, the mass ratio of the content of the anionic water-soluble resin (CAP) relative to the content of the resin particles (CP) (CAP/CP) is preferably 0.02 or more and 30 or less. When the mass ratio is 0.02 or more, the resin, particles can be prevented from being contained in an excessively large amount as compared with the amount of the anionic water-soluble resin. By making the amount of the anionic water-soluble resin within an appropriate range relative to the amount of the resin particles, the aggregation property of ink components is likely to be improved, and the occurrence of blurring or bleeding can be suppressed. When the mass ratio is 30 or less, the anionic water-soluble resin can be prevented from being contained in an excessively large amount. In addition, the inclusion compound is likely to be prevented from being contained in an excessively small amount, as compared with the amount, of the anionic water-soluble resin.

Inclusion Compound

In the first and second inventions, the ink contains an inclusion compound. In the third and fourth inventions, the first liquid composition contains an inclusion compound. In the fifth, and sixth, inventions, the second, liquid composition contains an inclusion compound, The inclusion compound is a compound functioning as a host molecule, and any inclusion compound capable of at least partly including the anionic water-soluble resin as a guest molecule can be used without limitation. The inclusion compound is preferably exemplified by cyclodextrins, crown ethers, cryptanas, macrocyclic amines, calixarenes, thiacalixarenes, cyclophanes, proteins, DNAs, and RNAs. Among them, cyclodextrins are preferred as the inclusion compound. This is because the outside of the cyclic structure of the cyclodextrins is hydrophilic and thus the cyclodextrins can be stably present in the ink containing water, the first liquid composition, and the second liquid composition. In addition, the cyclodextrins have a stable structure because hydroxy groups contained in the molecule form hydrogen bonds in the molecule. On this account, even when the inclusion compound is added to the ink, the structure is unlikely to be changed before and after the application of the first liquid composition. Even when the inclusion compound is added to the first liquid composition, the structure is unlikely to be changed. Even when the inclusion compound is added to the second liquid composition, the interaction with at least a part of the anionic water-soluble resin can be maintained. As a result, the inclusion compound is supposed to produce a large effect of reducing the rate of volumetric shrinkage of the anionic water-soluble resin.

Examples of the cyclodextrins include cyclodextrins and cyclodextrin derivatives.

Specific examples of the cyclodextrin include $\alpha$-cyclodextrin, $\beta$-cyclodextrin, $\gamma$-cyclodextrin, and $\delta$-cyclodextrin, Among them, $\gamma$-cyclodextrin is particularly preferred because a much larger effect of reducing the rate of volumetric shrinkage of the anionic water-soluble resin is produced, $\gamma$-cyclodextrin has a lot of portions which are capable of being interacted, with the anionic water-soluble resin, because $\gamma$-cyclodextrin has a large cyclic structure compared with $\alpha$-cyclodextrin and $\beta$-cyclodextrin. For example, even if the anionic water-soluble resin has a large hydrophobic side chain, $\gamma$-cyclodextrin is capable of being interacted with the large hydrophobic side chain. Examples of the cyclodextrin derivative include compounds prepared by substituting the hydroxy group present in the structure of cyclodextrins by a group except the hydroxy group, such as a methoxy group and an amino group. Other examples include compounds prepared by converting the ether bond present in the structure of cyclodextrins to a bond such as a bond with an imino group (—NH—) and a sulfide bond (—S—). Specific examples of the cyclodextrin derivative include methyl-$\beta$-cyclodextrin, hydroxypropyl-$\beta$-cyclodextrin, hydroxypropyl-$\gamma$-cyclodextrin, maltosyl-$\beta$-cyclodextrin, dimaltosyl-$\beta$-cyclodextrin, trimaltosyl-$\beta$-cyclodextrin, trimethyl-$\beta$-cyclodextrin, triacetyl-$\beta$-cyclodextrin, 3A-amino-3A-deoxy-(2AS,3AS)-$\alpha$-cyclodextrin hydrates, 2,6-di-O-methyl-$\beta$-cyclodextrin, poly-$\beta$-cyclodextrin, mono-2-O-(p- toluenesulfonyl)-γ-cyclodextrin, and 5,10,15,20-tetrakis[4-(per-O-methyl-α-cyclodextrin-6-yloxy)phenyl]porphyrin.

The content of the inclusion compound is preferably 0.1% by mass or more and 30.0% by mass or less based on the total mass of the ink. In the first and second inventions in which the ink contains the inclusion compound, the mass ratio of the content of the anionic water-soluble resin (CAP) in the ink relative to the content of the inclusion compound (CI) (CAP/CI) is preferably 0.07 or more and 30 or less. When the mass ratio is 0.07 or more, the anionic water-soluble resin is contained in a large amount, and thus the aggregation property of ink components is improved. Accordingly, the occurrence of blurring or bleeding can be effectively suppressed. When the mass ratio is 30 or less, the inclusion compound is contained in a large amount, and thus the inclusion compound is likely to exert the suppressive effect on volumetric shrinkage of the anionic water-soluble resin. Accordingly, the occurrence of the image shift phenomenon can be effectively suppressed.

In the first and second, inventions, the mass ratio of the content of the resin particles (CP) in the ink relative to the content of the inclusion compound (CI) in the ink (CP/CI) is preferably 0.05 or more, and more preferably 0.05 or more and 15 or less. When the mass ratio is 0.05 or more, the inclusion compound can be prevented from being contained in an excessively large amount relative to the amount of the resin particles, and the reduction in aggregation property of ink components is likely to be suppressed. It is supposed that the resin particles react with an organic acid and/or a polyvalent metal ion contained in the liquid composition to lose the dispersibility thereof to aggregate and then form a film. However, when the inclusion compound is excessively present, the resin particles are likely to be prevented from forming a film, and thus the aggregation property is supposed to be likely to deteriorate.

Aqueous Medium

The ink can contain an aqueous medium. As the aqueous medium, water or a mixed solvent of water and a water-soluble organic solvent can be used. The content of the water-soluble organic solvent is preferably 3.0% by mass or more and 50.0% by mass or less based on the total mass of the aqueous medium. The water-soluble organic solvent is not limited, to particular solvents and is exemplified, by known solvents. Examples of the water-soluble organic solvent include alcohols, glycols, alkylene glycols having an alkylene group with 2 to 6 carbon atoms, polyalkylene glycols, nitrogen-containing compounds, and sulfur-containing compounds. The water-soluble organic solvents can be used singly or in combination of two or more of them. The water is preferably deionized water (ion-exchanged water). The content of the water is preferably 50.0% by mass or more and 95.0% by mass or less based on the total mass of the aqueous medium.

The content of the aqueous medium is preferably 35% by mass or more and 90% by mass or less based on the total mass of the ink.

Other Components

The ink can contain water-soluble organic compounds that are solid at normal temperature, including polyhydric alcohols such as trimethylolpropane and trimethylolethane, urea, and urea derivatives such as ethylene urea, as necessary, in addition to the above-mentioned components. The ink can further: contain various additives such as surfactants, pH adjusters, anticorrosives, antiseptic agents, antifungal agents, antioxidants, reduction inhibitors, evaporation accelerators, chelating agents, and resins other than the above resin particles, as necessary.

First Liquid Composition

The first liquid composition may be any liquid compositions as long as images formed with the ink are not affected by treatment with the first liquid composition, and is preferably transparent, colorless and transparent, milky white, or white. On this account, the first liquid composition preferably has a ratio of a maximum absorbance to a minimum absorbance (maximum absorbance/minimum absorbance) of 1.0 or more and 2.0 or less in a wavelength region of 400 nm to 800 nm, which is the wavelength region of visible light. This means that the first liquid composition has substantially no absorbance peak in the visible light wavelength region or, if the first liquid composition has a peak, the intensity of the peak is extremely small. In addition, the first liquid composition preferably contains no coloring material. The absorbance can be determined by using an undiluted liquid composition with a Hitachi double beam spectrophotometer, U-2900 (manufactured, by Hitachi High-Technologies Corporation). The first liquid composition can be diluted and subjected to the absorbance measurement. This is because both the maximum absorbance and the minimum absorbance of the first liquid, composition are proportionate, to a dilution ratio and thus the ratio of the maximum absorbance to the minimum absorbance (maximum absorbance/minimum absorbance) does not depend on the dilution ratio.

Reactant

The first, liquid composition contains at least one of an organic acid and a polyvalent metal ion as a reactant. The reactant has a function of destabilizing the dissolution or dispersion state of at least an anionic component of the anionic water-soluble resin in the ink.

As the polyvalent metal ion, a divalent or higher-valent metal ion is preferably used. Specific examples of the polyvalent metal ion include divalent metal ions such as $Ca^{2+}$, $Cu^{2+}$, $Ni^{2+}$, $Mg^{2+}$, $Sr^{2+}$, $Ba^{2+}$, and $Zn^{2}$; and trivalent metal ions such as $Fe^{3+}$, $Cr^{3+}$, $Y^{3+}$, and $Al^{3+}$. The polyvalent metal ion can be added to the first liquid composition in a salt form such as hydroxides and chlorides, which can dissociate to form the ion. The polyvalent metal salt is preferably formed from at least one polyvalent metal ion selected from the group consisting of $Ca^{2+}$, $Cu^{2+}$, $Ni^{2+}$, $Mg^{2+}$, $Zn^{2+}$, $Ba^{2+}$, $Al^{3+}$, $Fe^{3+}$, $Cr^{3+}$ and $Y^{3+}$, and a negative ion.

The content of the polyvalent metal ion is preferably 3.0% by mass or more and 90.0% by mass or less and more preferably 5.0% by mass or more and 70.0% by mass or less based, on the total mass of the first liquid composition.

Specific examples of the organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, oxysuccinic acid, and dioxysuccinic acid.

The content of the organic acid is preferably 3.0% by mass or more and 90.0% by mass or less and more preferably 5.0% by mass or more and 70.0% by mass or less based on the total mass of the first liquid composition.

Inclusion Compound in First Liquid Composition

In the third and fourth inventions, when the ink contains no inclusion compound, the first liquid composition contains an inclusion compound. The inclusion compound may be any inclusion compounds that can at least partly include the anionic water-soluble resin in the ink. As the inclusion compound, cyclodextrins are preferred. The content of the inclusion compound is preferably 1% by mass or more and 30.0% by mass or less based on the total mass of the first liquid composition.

When the first liquid composition contains the inclusion compound, the mass ratio of the amount of the anionic water-soluble resin (MA) relative to the amount of the inclusion compound (MI) (MA/MI) is preferably 0.07 or more and 30 or less. The amount of the inclusion compound is the amount of the inclusion compound on a recording medium calculated from an application amount of the first liquid composition. The amount of the water-soluble resin is the amount of the water-soluble resin on a recording medium calculated from the amount of an ink applied to form an image (ink application amount).

When the mass ratio is 0.07 or more, the anionic water-soluble resin is contained in a large amount, and thus the aggregation property of ink components is improved. Accordingly, the occurrence of blurring or bleeding can be effectively suppressed. When the mass ratio is 30 or less, the inclusion compound is contained in a large amount, and thus the inclusion compound is likely to exert the suppressive effect on volumetric shrinkage of the anionic water-soluble resin. Accordingly, the occurrence of the image shift phenomenon can be effectively suppressed.

Aqueous Medium

The first liquid composition is prepared as a liquid applicable to a recording medium and can contain an aqueous medium. As the aqueous medium, water or a mixed solvent of water and a water-soluble organic solvent can be used. The content of the water-soluble organic solvent is preferably 3.0% by mass or more and 50.0% by mass or less based on the total mass of the aqueous medium. The water-soluble organic solvent is not limited to particular solvents and is exemplified by known solvents. Examples of the water-soluble organic solvent include alcohols, glycols, alkylene glycols having an alkylene group with 2 to 6 carbon atoms, polyethylene glycols, nitrogen-containing compounds, and sulfur-containing compounds. The water-soluble organic solvents can be used singly or in combination of two or more of them. The water is preferably deionized water (ion-exchanged water). The content of the water is preferably 5.0% by mass or more and 95.0% by mass or less based on the total mass of the aqueous medium.

The content of the aqueous medium is preferably 8% by mass or more and 95% by mass or less based on the total mass of the first liquid composition.

Other Components

The first liquid composition can contain various components, as necessary, in addition to the above-mentioned components. The first liquid composition may contain the above-mentioned anionic water-soluble resin, the resin particles, the inclusion compound, or a polyalxylene glycol compound, for example. The first liquid composition may also contain water-soluble organic compounds that are solid at normal temperature, including polyhydric alcohols such as trimethylolpropane and trimethylolethane, urea, and urea derivatives such as ethylene urea. The first liquid composition, may further contain various additives such, as resin particles, water-soluble resins, surfactants, pH adjusters, anticorrosives, antiseptic agents, antifungal agents, antioxidants, reduction inhibitors, evaporation accelerators, chelating agents, and resins, as necessary.

Second Liquid Composition

The second liquid composition in the fifth and sixth inventions contains an anionic water-soluble resin and an inclusion compound. The second liquid composition may be any liquid compositions as long as images formed with the ink are not affected by treatment with the second liquid composition, and is preferably transparent, colorless and transparent, milky white, or white. On this account, the second liquid composition preferably has a ratio $A_{max}/A_{min}$ of a maximum absorbance $A_{max}$ to a minimum absorbance $A_{min}$ of 1.0 or more and 2.0 or less in a wavelength region of 400 nm to 780 nm, which is the wavelength region of visible light. This means that the second liquid composition has substantially no absorbance peak in the visible light wavelength region or, if the second liquid composition has a peak, the intensity of the peak is extremely small. Such a second liquid composition of the present invention preferably contains no coloring material. The absorbance can be determined by using an undiluted second liquid composition with a Hitachi double beam spectrophotometer, U-2900 (manufactured by Hitachi High-Technologies Corporation). The second liquid composition can be diluted with a solvent not affecting the absorbance measurement and be subjected to the absorbance measurement. This is because both the maximum absorbance $A_{max}$ and the minimum absorbance $A_{min}$ of the second liquid composition are proportionate to a dilution ratio and thus the value, $A_{max}/A_{min}$ does not depend on the dilution ratio.

Anionic Water-soluble Resin

In the fifth and sixth inventions, the second liquid composition contains an anionic water-soluble resin. The anionic water-soluble resin is the same as the anionic water-soluble resin described, in "Ink".

The content, of the anionic water-soluble resin is preferably 0.3% by mass or more and 30.0% by mass or less based on the total mass of the second liquid, composition.

Inclusion Compound

In the fifth and sixth inventions, the second liquid composition contains an inclusion compound. The inclusion compound is the same as the inclusion compound described in "Ink".

The content of the inclusion compound is preferably 0.5% by mass or more and 40.0% by mass or less based on the total mass of the second liquid composition.

In the second liquid composition, the mass ratio of the content of the anionic waiter-soluble resin (CA) relative to the content of the inclusion compound (CI) (CA/CI) is preferably 0.07 or more and 30 or less. When the mass ratio (CA/CI) is 0.07 or more, the suppressive effect of blurring and bleeding can be effectively achieved. This is because the inclusion compound that, does not react with the first liquid composition is prevented from being contained in an excessively large amount as compared with the amount of the anionic water-soluble resin, and the reduction in aggregation property is likely to be suppressed. When the mass ratio (CA/CI) is 30 or less, the image shift phenomenon can be effectively suppressed. This is because the proportion of the inclusion compound that includes the anionic water-soluble resin is prevented from being reduced, and the effect of reducing the rate of volumetric shrinkage is likely to be improved.

Aqueous Medium

The second liquid composition is prepared as a liquid, applicable to a recording medium and can contain an aqueous medium. As the aqueous medium, water or a mixed solvent of water and a water-soluble organic solvent can be used. The content of the water-soluble organic solvent is preferably 3.0% by mass or more and 50.0% by mass or less based on the total mass of the aqueous medium. The water-soluble organic solvent is not limited to particular solvents and is exemplified by known solvents. Examples of the water-soluble organic solvent include alcohols, glycols, alkylene glycols having an alkylene group with 2 to 6 carbon atoms, polyethylene glycols, nitrogen-containing compounds, and sulfur-containing compounds. The water-soluble organic solvents can be used singly or in combination of two or more of them. The water is preferably deionized water (ion-exchanged water). The content of the water is preferably 30.0% by mass or more and 95.0% by mass or less based, on the total mass of the aqueous medium.

The content of the aqueous medium is preferably 35% by mass or more and 90% by mass or less based on the total mass of the second liquid composition.

Other Components

The second liquid composition can contain various components, as necessary, in addition to the above-mentioned components.

The second liquid composition may contain the resin particles described in "Ink". The second liquid composition contains the anionic water-soluble resin that forms a film on the image surface to reduce unevenness on the image surface. On this account, the second liquid composition can impart glossiness to images. If added, the resin particles form a film on images together with the anionic water-soluble resin to reduce unevenness on the image surface, and thus can further impart glossiness to images. Examples of the resin particles include acrylic resin particles, vinyl acetate resin particles, ester resin particles, ethylene resin particles, urethane resin particles, synthetic rubber particles, vinyl chloride resin particles, vinylidene chloride resin particles, and olefinic resin particles.

The second liquid composition may also contain water-soluble organic compounds that are solid at normal temperature, including polyhydric alcohols such as trimethylolpropane and trimethylolethane, urea, and urea derivatives such as ethylene urea. The second liquid composition may further contain various additives such as nonionic water-soluble resins, surfactants, pH adjusters, anticorrosives, antiseptic agents, antifungal agents, antioxidants, reduction inhibitors, evaporation accelerators, chelating agents, and resins other than the above resin particles, as necessary.

Set of Ink and Liquid Composition

One of the embodiments of the present invention is a liquid set for image recording including an ink containing a coloring material, an anionic water-soluble resin, resin particles and an inclusion compound, and a liquid composition containing at least one of an organic acid and a polyvalent metal ion.

One of the embodiments of the present invention is a liquid set for image recording including an ink containing a coloring material, an anionic water-soluble resin and resin particles, and a first liquid composition containing at least one of an organic acid and a polyvalent metal ion and containing an inclusion compound.

One of the embodiments of the present invention is a liquid set for image recording including an ink containing a coloring material, a first liquid composition containing at least one of an organic acid and a polyvalent metal ion, and a second liquid composition containing an anionic water-soluble resin and an inclusion compound.

Image Recording Method

The image recording method of the present invention is exemplified by "direct drawing type image recording method" in which an ink and a liquid composition are directly applied to a recording medium to record an image and "intermediate transfer type image recording method" in which an ink and a liquid composition are applied to an intermediate transfer member as a recording medium to form an intermediate image and then the intermediate image is transferred to a recording medium such as paper to form an image.

In the first to fourth inventions, "direct drawing type image recording method" is a method in which an ink and a first liquid composition are directly applied to at recording medium such as paper on which an image is finally formed and an image is recorded. In the fifth and sixth inventions, "direct drawing type image recording method" is a method in which an ink, a first liquid composition, and a second liquid composition are directly applied to a recording medium and an image is recorded.

In the first to fourth inventions, "intermediate transfer type image recording method" is a method in which an ink and a first liquid composition are applied to an intermediate transfer member as a recording medium (first recording medium) to form an intermediate image, then the intermediate image is transferred to a recording medium (second recording medium) such as paper on which an image is finally formed, and an image is recorded. In the fifth and sixth inventions, "intermediate transfer type image recording method" is a method in which an ink, a first liquid composition, and a second liquid composition are applied to an intermediate transfer member as a recording medium to form an intermediate image, then the intermediate image is transferred to a recording medium such as paper, and an image is recorded.

The respective image recording methods will next be described.

[1] Direct Drawing Type Image Recording Method

The direct drawing type image recording method includes an ink application step (A) of applying an ink to a recording medium and a first liquid composition application step (B) of applying a first liquid, composition to the recording medium so as to at least partly overlap with an area where the ink is applied. The method further includes a second liquid composition application step (C) of applying a second liquid composition to the recording medium so as to at least partly overlap with an area where the first liquid composition is applied, as necessary.

The method may further include a fixing step of pressurizing the recording medium on which an image has been recorded, with a roller after the above steps.

Ink Application Step

The means of applying the ink to the recording medium is preferably an ink jet recording method including a step of ejecting an ink from an ink jet recording head in response to recording signals to conduct recording on a recording medium. Particularly preferred is an ink jet recording method in which thermal energy is applied to an ink and then the ink is ejected from an outlet of a recording head.

First Liquid Composition Application Step

The means of applying the first liquid composition to the recording medium is exemplified by an ink jet system and a coating system. The coating system is exemplified by roller coating, bar coating, and spray coating.

Second Liquid Composition Application Step

The means of applying the second liquid composition to the recording medium is exemplified by an ink jet system and a coating system. The coating system is exemplified by roller coating, bar coating, and spray coating.

Fixing Step

In the fixing step, pressurization enables an improvement in smoothness of an image. In this step, a roller is preferably heated when a recording medium is pressurized with the roller. Pressurization with a heated roller enables an improvement in toughness of an image. In addition, by controlling the heating temperature, the glossiness of a resulting image can be adjusted.

Recording Medium

In the direct drawing type image recording method, the recording medium includes paper commonly used for print and also widely encompasses fabrics, plastics, films, and similar materials. The recording medium used in the image recording method of the present invention may be a recording medium cut into a desired size in advance. The recording medium may also be a rolled sheet, which is cut into a desired size after image recording.

Direct Drawing Type Image Recorder

FIG. 1 is a schematic view illustrating an exemplary direct drawing type image recorder used for the direct drawing type image recording method. In FIG. 1, a recording medium 1 is conveyed in the arrow direction along a conveyance stage 3 by a conveyance mechanism (not illustrated). To the recording medium 1, a first liquid composition is applied with a roller (or a liquid ejecting head) 4 which is an application unit of the first liquid composition. Then, the recording medium 1 is further conveyed toward the downstream side (in the arrow direction), and an image is formed with a liquid ejecting head 5 by using a black ink (Bk ink), a cyan ink (C ink), a magenta ink (M ink), and a yellow ink (C ink) each prepared by the above method.

Then, the recording medium 1 is further conveyed, toward the downstream side, and a transparent ink (second liquid composition) may be applied with a liquid ejecting head 6.

[2] Intermediate Transfer Type Image Recording Method

In the intermediate transfer type image recording method, "intermediate transfer member" corresponds to "recording medium". Accordingly, a recording medium such as paper onto which an intermediate image is finally transferred is referred to as "transfer medium" in the following description.

Figure 2:
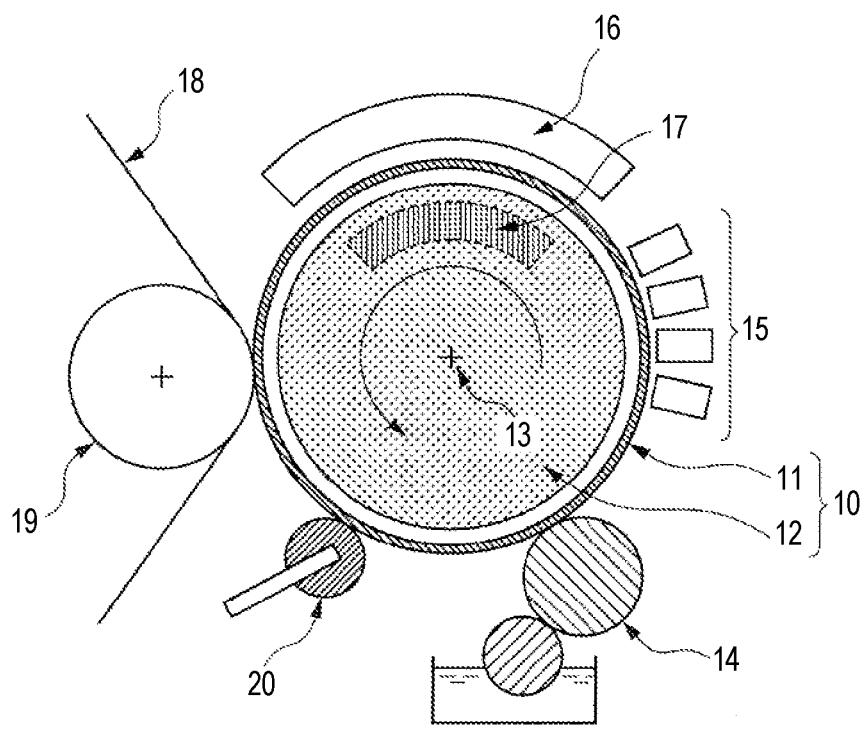
FIG. 2 is a schematic view illustrating an exemplary intermediate transfer type image recorder.

FIG. 2 is a schematic view illustrating an exemplary intermediate transfer type image recorder used for the intermediate transfer type image recording method. In FIG. 2, an intermediate transfer member 10 (recording medium) includes a rotatable drum-shaped support member 12 and a surface layer member 11 provided on the outer peripheral surface of the support member 12. The intermediate transfer member 10 (support member 12) is rotationally driven in the arrow direction (in the counterclockwise direction shown in FIG. 2) around a rotating shaft 13 as the center. Each member arranged around the intermediate transfer member 10 is configured to work in such a way as to be synchronized with the rotation of the intermediate transfer member 10. A first liquid composition is applied to the intermediate transfer member 10 with a coating roller 14, for example. Inks are applied from ink jet recording heads 15, and the mirror-inverted intermediate image of an intended image is formed on the intermediate transfer member 10. When applied, a second liquid composition is applied with ink jet recording heads 15, for example. Next, the temperature of the intermediate image formed on the intermediate transfer member may be controlled to a desired temperature by a temperature control mechanism 17. At this time, the liquid in the intermediate image formed on the intermediate transfer member may be removed by a liquid removal mechanism 16. Next, a pressure roller 19 is used to bring a transfer medium 18 into contact with the intermediate transfer member 10, and thus the intermediate image is transferred to the transfer medium 18. For a step of washing the surface of the intermediate transfer member, a cleaning unit 20 may be provided. The intermediate transfer member and the respective steps will next be described.

Intermediate Transfer Member

The intermediate transfer member is a recording medium holding a first liquid composition, an ink and a second liquid composition to have an intermediate image recorded thereon. The intermediate transfer member is exemplified by a member including a support member that is handled, in order to convey a required force and including a surface layer member on which an intermediate image is recorded. The support member and the surface layer member may be integrated.

The shape of the intermediate transfer member is exemplified by a sheet shape, a roller shape, a drum shape, a belt shape, and an endless web shape. The size of the intermediate transfer member may be appropriately designed in accordance with the size of a recordable transfer medium.

The support member of the intermediate transfer member is required to have a certain strength from the viewpoint of the transfer accuracy and the durability thereof. The material for the support member is preferably metals, ceramics, and resins, for example. Specifically preferred are aluminum, iron, stainless steel, acetal resins, epoxy resins, polyimide, polyethylene, polyethylene terephthalate, nylon, polyurethane, silica ceramics, and alumina ceramics. A support member formed of such a material can achieve the rigidity capable of withstanding the pressure during transfer and dimensional accuracy and can reduce the inertia during operation to improve the control responsivity. These materials can be used singly or in combination of two or more of them.

From the intermediate transfer member, an intermediate image is transferred to a transfer medium such as paper, arid thus the surface layer of the intermediate transfer member is required to have a certain elasticity. For example, when the case of using paper as the transfer medium is supposed, the surface layer of the intermediate transfer member preferably has a durometer A hardness (durometer type A hardness) of 10 degree or more and 100 degree or less and more preferably 20 degree or more and 60 degree or less, which is determined in accordance with JIS K6253. The material for the surface layer member constituting the surface layer of the intermediate transfer member is preferably metals, ceramics, and resins, for example. Specifically preferred are polybutadiene rubbers, nitrile rubbers, chloroprene rubbers, silicone rubbers, fluororubbers, fluorosilicone rubbers, urethane rubbers, styrenic elastomers, olefinic elastomers, polyvinyl chloride elastomers, ester elastomers, amide elastomers, polyether, polyester, polystyrene, polycarbonate, siloxane compounds, and perfluorocarbon compounds. The surface layer member may be formed by laminating a plurality of materials. Examples of such a member include a material prepared by laminating a silicone rubber on an endless-belt like urethane rubber sheet, a material prepared by laminating a silicone rubber on a polyethylene terephthalate film, and a material prepared by forming a siloxane compound film on a urethane rubber sheet.

The surface of the intermediate transfer member may be subjected to a surface treatment. The surface treatment is exemplified by flame treatment, corona treatment, plasma treatment, polishing treatment, roughening treatment, active energy ray irradiation treatment, ozone treatment, surfactant treatment, and silane coupling treatment. These treatments may be performed in combination.

In order to prevent an intermediate image on the intermediate transfer member from flowing, the surface of the intermediate transfer member preferably has an arithmetic average roughness of 0.01 μm or more and 3 μm or less, which is determined in accordance with JIS B 0601: 2001.

The surface of the intermediate transfer member preferably has a water contact angle of 50 degree or more and 110 degree or less and more preferably 60 degree or more and 100 degree or less.

Ink Application Step

In the ink application step, an ink is applied to the intermediate transfer member. As the means of applying the ink to the intermediate transfer member, an ink jet system is preferably used. Particularly preferred is a system in which thermal energy is applied to an ink and the ink is ejected from an outlet of a recording head.

As the ink jet recording head, a line head or a serial head can be used, for example. On the ink jet head of the line head system, ink ejection orifices are arranged in a direction orthogonal to the rotation direction of the intermediate transfer member (in the axis direction in the case of a drum type). The serial head, is a head to be scanned in a direction orthogonal to the rotation direction of the intermediate transfer member for recording.

First Liquid Composition Application Step

In the first liquid composition application step, a first liquid composition is applied to the intermediate transfer member. The means of applying the first liquid composition to the intermediate transfer member is exemplified by coating systems such as roller coating, bar coating, and spray coating and an ink jet system. The coating system is particularly preferably used. In the intermediate transfer type image recording method, the first liquid composition application step is preferably provided prior to the ink application step.

Second Liquid Composition Application Step

In the second liquid composition application step, a second liquid composition is applied to the intermediate transfer member. The means of applying the second liquid composition to the intermediate transfer member is exemplified by coating systems such as roller coating, bar coating, and spray coating and an ink jet system. The ink jet system is particularly preferably used. In the intermediate transfer type image recording method, the second liquid composition application step is preferably provided after the ink application, step and the first liquid composition application step.

Liquid Removal Step

After the formation of an intermediate image by the application of the ink and the liquid compositions and prior to the transfer step, a liquid removal step of removing the liquid from the intermediate image formed on the intermediate transfer member may be provided. If an intermediate image contains an excess liquid, the excess liquid overflows, for example, in the transfer step to deteriorate the image quality of a resulting image in some cases. To address this, an excess liquid is preferably removed from the intermediate image in the liquid removal step. The method of removing the liquid is exemplified by heating, blowing of low humidity air, decompressing, natural drying, and combination methods thereof.

Transfer Step

In the transfer step, by bringing a transfer medium, into contact with the intermediate image recorded on the intermediate transfer member, the image is transferred from the intermediate transfer member to the transfer medium and is recorded on the transfer medium. When an intermediate image is transferred to the transfer medium, a pressure roller is preferably used, for example, to pressurize the intermediate image from both sides of the intermediate transfer member and the transfer medium. The pressurization enables an improvement of the transfer efficiency. At this time, the pressurization can be performed, in multiple steps.

As mentioned above, as high-speed recording is increasingly demanded, high transfer efficiency is required to be achieved even at high transfer speeds. To satisfy such a requirement, the transfer speed, which means the conveying speed of the transfer medium in the present invention, is preferably 1.0 m/sec or more and more preferably 2.0 m/sec or more.

During the transfer, the intermediate image is preferably heated. The method of heating the intermediate image is exemplified, by a method of heating the pressure roller at a predetermined transfer temperature and a method of providing a heater separately. The heating temperature of the pressure roller in the transfer step is preferably set according to resin particles used and is more preferably 25° C. or more and 200° C. or less.

The temperature when the intermediate image comes in contact with the recording medium, is preferably not lower than the glass transition point of resin particles, and the temperature when the intermediate image is released from the intermediate transfer member is preferably lower than the glass transition point of the resin particles. When the temperature of the intermediate image upon contact is not lower than the glass transition point of resin particles, the flowability of the resin particles increases to improve the adhesion between the recording medium and the intermediate image. When the temperature of the intermediate image upon release is lower than the glass transition point of the resin particles, the resin particles become in a glass state, and thus the interface between the intermediate image and the recording medium is unlikely to be separated. As a result, the transfer efficiency to transfer it to the recording medium can be further improved. The temperature of the intermediate image upon contact with the recording medium, is the temperature of the intermediate image at the point of time when at least a part of the intermediate image comes in contact with the recording medium. The temperature of the intermediate image upon release from, the intermediate transfer member is the temperature of the intermediate image at the point of time when all of the intermediate image is transferred to the recording medium. The temperature of the intermediate image layer is a value determined by using an infrared radiation thermometer, The difference between the temperature of the intermediate image upon contact with the recording medium and the glass transition point of the resin particles is preferably 0° C. or more and 35° C. or less and more preferably 10° C. or more and 35° C. or less. The difference between the temperature of the intermediate image upon release from the intermediate transfer member and the glass transition point of the resin particles is preferably 1° C. or more and 60° C. or less.

The temperature of the intermediate image upon contact with the recording medium is preferably 50° C. or more and 140° C. or less. The temperature of the intermediate image upon release from the intermediate transfer member is preferably 25° C. or more and 70° C. or less.

Transfer Medium

In the present invention, the transfer medium includes paper commonly used for print and also widely encompasses fabrics, plastics, films, and similar materials. The transfer medium, may be a transfer medium cut into a desired size in advance. The transfer medium may also be a rolled sheet, which is cut into a desired size after image recording.

Fixing Step

After the transfer step, a fixing step of pressurizing the transfer medium on which an intermediate image has been transferred with, a roller may be provided. The pressurization enables an improvement in smoothness of an image.

When the transfer medium on which an image has been transferred, is pressurized with a roller, the roller is preferably heated. Pressurization with a heated roller enables an improvement in toughness of an image. In addition, by controlling the heating temperature, the glossiness of a resulting image can be adjusted.

Cleaning Step

After the transfer step, a cleaning step of cleaning the surface of the intermediate transfer member may be provided. As the method of cleaning the intermediate transfer member, any conventional methods can be used. Specific examples of the method include a method of applying a shower of a cleaning liquid to the intermediate transfer member, a method of bringing a wet motion roller into contact with the intermediate transfer member to wipe the intermediate transfer member, a method of bringing the intermediate transfer member into contact with the surface of a cleaning liquid, a method of wiping off a residue on the intermediate transfer member with a wiper blade, a method of applying various energies to the intermediate transfer member, and combination methods thereof.

EXAMPLES

The present invention will next be described in further detail with reference to examples and comparative examples. The present invention is not intended to be limited to the following examples without departing from the scope of the invention. In the following description in examples, "part" is based on mass unless otherwise noted.

Preparation of Ink
Preparation of Coloring Material
Dye

C.I. Food Black-2 was prepared as a black dye, C.I. Acid Blue-9 was prepared as a cyan dye, and C.I. Acid Red-289 was prepared as a magenta dye.

Self-Dispersible Pigment

A commercially available pigment dispersion liquid. (Cab-O-JET 200; manufactured by Cabot Co.) was used as a self-dispersible black pigment. A commercially available pigment dispersion liquid. (Cab-O-Jet 250C; manufactured by Cabot Co.) was used as a self-dispersible cyan pigment. A commercially available pigment dispersion liquid (Cab-O-Jet 465M; manufactured by Cabot Co.) was used as a self-dispersible magenta pigment.

Pigment Dispersion Containing Anionic Water-soluble Resin As Dispersant

Resin-Dispersion Type Black Pigment
Carbon black (product name: Monarch 1100, manufactured by Cabot Co.): 10 parts
An aqueous solution of an anionic water-soluble resin, which is a pigment dispersant (resin: a styrene-ethyl acrylate-acrylic acid copolymer, an acid value of 150, a weight average molecular weight of 8,000, prepared by neutralizing an aqueous solution having a resin content of 20.0% by mass with an aqueous potassium hydroxide solution): 10 parts
Pure water: 80 parts These materials were mixed and put in a batch type vertical sand mill (manufactured by Aimex Co.), and 200 parts of 0.3-mmφ zirconia beads were also put. The mixture was dispersed for 5 hours while being cooled with water. The thus-obtained dispersion liquid was subjected to centrifugation to remove coarse particles, giving pigment dispersion 1 containing the black pigment dispersed with the dispersant resin (pigment content: 10.0% by mass). The pigment dispersion 1 was used in ink 3A in Table 1-1 and in ink 27A in Table 1-2.

Additionally, black pigment dispersion 2 was prepared by the same dispersion operation as the above except that the following materials were used.
Carbon black (product name: Monarch 1100, manufactured by Cabot Co.): 10 parts
An aqueous solution of an anionic water-soluble resin which is a pigment dispersant (resin: a styrene-ethyl acrylate-acrylic acid copolymer, an acid value of 150, a weight average molecular weight of 8,000, prepared by neutralizing an aqueous solution having a resin content of 20.0% by mass with an aqueous potassium hydroxide solution): 30 parts
Pure water: 60 parts The thus-obtained black, pigment dispersion 2 was used in ink 4A in Table 1-1 and in ink 28A in Table 1-2.

Resin-Dispersion Type Cyan Pigment

A pigment dispersion containing a cyan pigment dispersed with a dispersant resin (pigment content: 10.0% by mass) was obtained, in the same manner as in the above (resin-dispersion type black pigment) except that C.I. Pigment Blue 1.5:3 was used in place of the carbon black.

Resin-Dispersion Type Magenta Pigment

A pigment dispersion containing a magenta pigment dispersed with a dispersant resin (pigment content: 10.0% by mass) was obtained in the same manner as the above (resin-dispersion type black pigment) except that C.I. Pigment Red 122 was used in place of the carbon black.

Anionic Water-soluble Resin

As the anionic water-soluble resin added to an ink, each of the following anionic water-soluble resins 1 to 5 was used.

Water-soluble Resin 1
A styrene-butyl acrylate-acrylic acid copolymer (acid value: 120 mg KOH/g, weight average molecular weight; 9,000, neutralizer: potassium hydroxide)

Water-soluble Resin 2
A styrene-butyl acrylate-acrylic acid copolymer (acid value: 90 mg KOH/g, weight average molecular weight: 7,000, neutralizer: potassium hydroxide)

Water-soluble Resin 3
A styrene-butyl acrylate-acrylic acid copolymer (acid value: ISO mg KOH/g, weight average molecular weight: 15,000, neutralizer: potassium hydroxide)

Water-soluble Resin 4
A benzyl methacrylate-methyl acrylate-acrylic acid copolymer (acid value: 120 mg KOH/g, weight average molecular weight: 9,000, neutralizer: potassium hydroxide)

Water-soluble Resin 5
A 9-anthrylmethyl methacrylate-methyl methacrylate-methacrylic acid copolymer (acid value: 120 mg KOH/g, weight average molecular: weight: 11,000, neutralizer: potassium hydroxide)

Preparation of Resin Particle Dispersion

First, 18 parts of ethyl methacrylate, 2 parts of 2,2'-azobis-(2-methylbutyronitrile), and 2 parts of n-hexadecane were mixed, and the mixture was stirred for 0.5 hour. The mixture was added dropwise to 78 parts of aqueous solution of 6% NIKKOL BC 15 (manufactured by Nikko Chemicals Co.), and the resulting mixture was stirred for 0.5 hour. Next, the mixture was sonicated with a sonicator for 3 hours. Subsequently, the mixture was polymerized under a nitrogen atmosphere at 80° C. for 4 hours. The reaction mixture was cooled to room temperature and then filtered, giving resin particle dispersion 1 having a resin particle content of 40.0% by mass. The resin particles had a weight average molecular weight of 250,000 and an average particle diameter ($D_{50}$) of 200 nm.

Preparation of Ink

Inks 1A to 37A

An inclusion compound, a coloring material, an anionic water-soluble resin, a resin particle dispersion, a polyalkylene glycol compound, glycerol, Acetylenol E 100, and ion-exchanged water were mixed in accordance with the amounts in Table 1-1 and Table 1-2 so as to give the following formulation. The remainder of ion-exchanged water is such an amount that the total amount of all the components constituting the ink becomes 100.0% by mass.

Inclusion compound: % by mass in Table 1-1
Coloring material; % by mass in Table 1-1 or Table 1-2
Anionic water-soluble resin: none or % by mass in Table 1-1 or Table 1-2
Resin particles: none or % by mass in Table 1-1 or Table 1-2
Glycerol; 7.0% by mass
Acetylenol E 100 (manufactured by Kawaken Fine Chemicals); 0.3% by mass
Ion-exchanged water: remainder
(Total amount: 100% by mass)

These materials were thoroughly stirred and dispersed and then subjected to pressure filtration through a microfilter with a pore size of 3.0 μm (manufactured by Fujifilm Corporation), giving inks (black inks) 1A to 37A.

Inks 38A and 39A

Inks 38A and 39A were prepared in the same manner as in the ink 3A except that the inclusion compound in the ink 3A was changed from α-cyclodextrin to methyl-β-cyclodextrin and γ-cyclodextrin, respectively. The formulations of the components included in the inks are shown in Table 1-3.

In Table 1-1, Table 1-2, and Table 1-3, the "content (% by mass)" of the coloring material represents the content of the dye, the self-dispersible pigment, or the resin-dispersion type pigment itself which is the coloring material (the mass of a resin dispersant is not included). The notation "resin-dispersed pigment" represents the case in which the above-mentioned pigment dispersion containing a black pigment dispersed with a dispersant resin was used, and the notation "anionic water-soluble resin amount in coloring material (% by mass)" represents the content rate of an anionic water-soluble resin contained, in an ink as the pigment dispersion relative to the total amount of the ink (the mass of a pigment is not included).

The "content (% by mass)" of resin particles represents the content percentage of resin particles contained, in an ink for the resin particle dispersion relative to the total amount of the ink.

Inks 1B to 39B

Inks (cyan inks) 1B to 39B were prepared in the same manner as in the inks 1A to 39A except that the black coloring materials were changed to the cyan coloring materials.

Inks 1C to 39C

Inks (magenta inks) 1C to 39C were prepared in the same manner as in the inks 1A to 39A except that the black coloring materials were changed to the magenta coloring materials.

TABLE 1-1

| Ink | Coloring material Type | Coloring material Content (% by mass) | Anionic water-soluble resin amount in coloring material (% by mass) | Anionic water-soluble resin Type | Anionic water-soluble resin Content (% by mass) | Resin particle dispersion Type | Resin particle dispersion Content (% by mass) | Inclusion compound Type | Inclusion compound Content (% by mass) |
|---|---|---|---|---|---|---|---|---|---|
| Ink 1A | Dye | 4 | 0 | Water-soluble resin 1 | 2 | Resin particle dispersion 1 | 10 | α-Cyclodextrin | 2 |
| Ink 2A | Self-dispersible pigment | 3 | 0 | Water-soluble resin 1 | 2 | Resin particle dispersion 1 | 10 | α-Cyclodextrin | 2 |
| Ink 3A | Resin-dispersed pigment | 4 | 0.8 | Water-soluble resin 1 | 2 | Resin particle dispersion 1 | 10 | α-Cyclodextrin | 2 |
| Ink 4A | Resin-dispersed pigment | 4 | 2.4 | — | 0 | Resin particle dispersion 1 | 10 | α-Cyclodextrin | 2 |
| Ink 5A | Dye | 4 | 0 | Water-soluble resin 2 | 2 | Resin particle dispersion 1 | 10 | α-Cyclodextrin | 2 |
| Ink 6A | Dye | 4 | 0 | Water-soluble resin 3 | 2 | Resin particle dispersion 1 | 10 | α-Cyclodextrin | 2 |
| Ink 7A | Dye | 4 | 0 | Water-soluble resin 4 | 2 | Resin particle dispersion 1 | 10 | Methyl-β-cyclodextrin | 5 |
| Ink 8A | Dye | 4 | 0 | Water-soluble resin 5 | 2 | Resin particle dispersion 1 | 10 | γ-Cyclodextrin | 2 |
| Ink 9A | Dye | 4 | 0 | Water-soluble resin 1 | 2 | Resin particle dispersion 1 | 10 | 4-Sulfocalix[6]arene | 2 |
| Ink 10A | Dye | 4 | 0 | Water-soluble resin 1 | 2 | Resin particle dispersion 1 | 10 | Bovine serum albumin | 2 |
| Ink 11A | Dye | 4 | 0 | Water-soluble resin 1 | 2 | Resin particle dispersion 1 | 10 | β-Cyclodextrin | 0.5 |
| Ink 12A | Dye | 4 | 0 | Water-soluble resin 1 | 2 | Resin particle dispersion 1 | 10 | γ-Cyclodextrin | 2 |
| Ink 13A | Dye | 4 | 0 | Water-soluble resin 1 | 2 | Resin particle dispersion 1 | 10 | Hydroxypropyl-β-cyclodextrin | 10 |
| Ink 14A | Dye | 4 | 0 | Water-soluble resin 1 | 2 | Resin particle dispersion 1 | 10 | Maltosyl-β-cyclodextrin | 20 |
| Ink 15A | Dye | 4 | 0 | Water-soluble resin 1 | 1.5 | Resin particle dispersion 1 | 10 | Methyl-β-cyclodextrin | 30 |
| Ink 16A | Dye | 4 | 0 | Water-soluble resin 1 | 2 | Resin particle dispersion 1 | 10 | Methyl-β-cyclodextrin | 30 |

TABLE 1-1-continued

| | Coloring material | | | Anionic water-soluble resin | | Resin particle dispersion | | Inclusion compound | |
|---|---|---|---|---|---|---|---|---|---|
| Ink | Type | Content (% by mass) | resin amount in coloring material (% by mass) | Type | Content (% by mass) | Type | Content (% by mass) | Type | Content (% by mass) |
| Ink 17A | Dye | 4 | 0 | Water-soluble resin 1 | 20 | Resin particle dispersion 1 | 10 | α-Cyclodextrin | 0.67 |
| Ink 18A | Dye | 4 | 0 | Water-soluble resin 1 | 20 | Resin particle dispersion 1 | 10 | α-Cyclodextrin | 0.5 |
| Ink 19A | Dye | 4 | 0 | Water-soluble resin 1 | 0.2 | Resin particle dispersion 1 | 25 | α-Cyclodextrin | 2 |
| Ink 20A | Dye | 4 | 0 | Water-soluble resin 1 | 0.2 | Resin particle dispersion 1 | 20 | α-Cyclodextrin | 2 |
| Ink 21A | Dye | 4 | 0 | Water-soluble resin 1 | 20 | Resin particle dispersion 1 | 0.1 | α-Cyclodextrin | 2 |
| Ink 22A | Dye | 4 | 0 | Water-soluble resin 1 | 25 | Resin particle dispersion 1 | 0.1 | α-Cyclodextrin | 2 |
| Ink 23A | Dye | 4 | 0 | Water-soluble resin 1 | 2 | Resin particle dispersion 1 | 10 | — | — |
| Ink 24A | Dye | 4 | 0 | — | — | Resin particle dispersion 1 | 10 | α-Cyclodextrin | 2 |
| Ink 25A | Dye | 4 | 0 | Water-soluble resin 1 | 2 | — | — | α-Cyclodextrin | 2 |

TABLE 1-2

| | Coloring material | | | Anionic water-soluble resin | | Resin particle dispersion | |
|---|---|---|---|---|---|---|---|
| Ink | Type | Content (%) | Water-soluble resin amount in coloring material (%) | Type | Content (%) | Type | Content |
| Ink 26A | Self-dispersible pigment | 3 | 0 | Water-soluble resin 1 | 2 | Resin particle dispersion 1 | 10 |
| Ink 27A | Resin-dispersed pigment | 4 | 0.8 | Water-soluble resin 1 | 2 | Resin particle dispersion 1 | 10 |
| Ink 28A | Resin-dispersed pigment | 4 | 2.4 | — | 0 | Resin particle dispersion 1 | 10 |
| Ink 29A | Dye | 4 | 0 | Water-soluble resin 2 | 0.2 | Resin particle dispersion 1 | 10 |
| Ink 30A | Dye | 4 | 0 | Water-soluble resin 3 | 7 | Resin particle dispersion 1 | 0.2 |
| Ink 31A | Dye | 4 | 0 | Water-soluble resin 4 | 6 | Resin particle dispersion 1 | 0.2 |
| Ink 32A | Dye | 4 | 0 | Water-soluble resin 5 | 0.2 | Resin particle dispersion 1 | 15.0 |
| Ink 33A | Dye | 4 | 0 | Water-soluble resin 1 | 2 | Resin particle dispersion 1 | 10 |
| Ink 34A | Dye | 4 | 0 | Water-soluble resin 1 | 6 | Resin particle dispersion 1 | 10 |
| Ink 35A | Dye | 4 | 0 | Water-soluble resin 1 | 6.5 | Resin particle dispersion 1 | 10 |
| Ink 36A | Dye | 4 | 0 | — | 0 | Resin particle dispersion 1 | 10 |
| Ink 37A | Dye | 4 | 0 | Water-soluble resin 1 | 1.6 | — | — |

TABLE 1-3

| Ink | Coloring material Type | Content (% by mass) | Anionic water-soluble resin amount in coloring material (% by mass) | Anionic water-soluble resin Type | Content (% by mass) | Resin particle dispersion Type | Content (% by mass) | Inclusion compound Type | Content (% by mass) |
|---|---|---|---|---|---|---|---|---|---|
| Ink 38A | Resin-dispersed pigment | 4 | 0.8 | Water-soluble resin 1 | 2 | Resin particle dispersion 1 | 10 | Methyl-β-cyclodextrin | 2 |
| Ink 39A | Resin-dispersed pigment | 4 | 0.8 | Water-soluble resin 1 | 2 | Resin particle dispersion 1 | 10 | γ-Cyclodextrin | 2 |

For the inks 1A to 25A, the mass ratios of the anionic water-soluble resin relative to the inclusion compound and the mass ratios of the anionic water-soluble resin relative to the resin particles are shown in Table 2.

TABLE 2

| | Anionic water-soluble resin/ inclusion compound | Anionic water-soluble resin/ resin particles |
|---|---|---|
| Ink 1A | 1 | 0.2 |
| Ink 2A | 1 | 0.2 |
| Ink 3A | 1.4 | 0.2 |
| Ink 4A | 1.2 | 0 |
| Ink 5A | 1 | 0.2 |
| Ink 6A | 1 | 0.2 |
| Ink 7A | 0.4 | 0.2 |
| Ink 8A | 1 | 0.2 |
| Ink 9A | 1 | 0.2 |
| Ink 10A | 1 | 0.2 |
| Ink 11A | 4 | 0.2 |
| Ink 12A | 1 | 0.2 |
| Ink 13A | 0.2 | 0.2 |
| Ink 14A | 0.1 | 0.2 |
| Ink 15A | 0.05 | 0.15 |
| Ink 16A | 0.067 | 0.2 |
| Ink 17A | 29.9 | 2 |
| Ink 18A | 40 | 2 |
| Ink 19A | 0.1 | 0.008 |
| Ink 20A | 0.1 | 0.01 |
| Ink 21A | 10 | 200 |
| Ink 22A | 12.5 | 250 |

TABLE 2-continued

| | Anionic water-soluble resin/ inclusion compound | Anionic water-soluble resin/ resin particles |
|---|---|---|
| Ink 23A | — | 0.2 |
| Ink 24A | — | — |
| Ink 25A | 1 | — |

Preparation of Liquid Composition

Liquid Compositions 1 to 18

An inclusion compound, a reactant, potassium hydroxide, glycerol, Acetylenol E 100, and ion-exchanged water ware mixed in accordance with, the amounts in Table 3 so as to give the following formulation. The remainder of ion-exchanged water is such an amount that the total amount of all the components constituting the ink becomes 100.0% by mass.

Inclusion compound: % by mass in Table 3
Reactant: % by mass in Table 3
Potassium hydroxide: % by mass in Table 3
Glycerol: 5.0% by mass
Surfactant: % by mass in Table 3
Ion-exchanged water: remainder
(Total amount: 100% by mass)

Then, the mixtures were subjected to pressure filtration through a microfliter with a pore size of 3.0 μm (manufactured by Fujifiim Corporation), giving liquid compositions 1 to 18.

TABLE 3

| First liquid composition | Inclusion compound Type | Content (%) | Reactant Type | Content (%) | KOH Content (%) | Surfactant Type | Content (%) |
|---|---|---|---|---|---|---|---|
| First liquid composition 1 | — | — | Glutaric acid | 30.0 | 5.0 | AE100 | 1 |
| First liquid composition 2 | — | — | Ca nitrate | 30.0 | — | AE100 | 1 |
| First liquid composition 3 | Methyl-β-cyclodextrin | 20 | Glutaric acid | 30.0 | 5.0 | AE100 | 1 |
| First liquid composition 4 | Methyl-β-cyclodextrin | 20 | Citric acid | 40.0 | 5.0 | AE100 | 1 |
| First liquid composition 5 | Methyl-β-cyclodextrin | 20 | Malic acid | 20.0 | 5.0 | AE100 | 1 |
| First liquid composition 6 | Methyl-β-cyclodextrin | 20 | Malonic acid | 55.0 | 5.0 | AE100 | 1 |
| First liquid composition 7 | Methyl-β-cyclodextrin | 20 | Ca nitrate | 30.0 | — | AE100 | 1 |
| First liquid composition 8 | 4-Sulfocalix[6]arene | 1 | Ca chloride | 3.0 | — | AE100 | 1 |
| First liquid composition 9 | Bovine serum albumin | 10 | Ca chloride | 3.0 | — | AE100 | 1 |
| First liquid composition 10 | α-Cyclodextrin | 10 | Glutaric acid | 20.0 | 5.0 | AE100 | 1 |

TABLE 3-continued

| First liquid composition | Inclusion compound | | Reactant | | KOH | Surfactant | |
|---|---|---|---|---|---|---|---|
| | Type | Content (%) | Type | Content (%) | Content (%) | Type | Content (%) |
| First liquid composition 11 | β-Cyclodextrin | 1 | Glutaric acid | 20.0 | 5.0 | AE100 | 1 |
| First liquid composition 12 | γ-Cyclodextrin | 10 | Glutaric acid | 40.0 | 5.0 | AE100 | 1 |
| First liquid composition 13 | Hydroxypropyl-β-cyclodextrin | 20 | Glutaric acid | 30.0 | 5.0 | AE100 | 1 |
| First liquid composition 14 | Maltosyl-β-cyclodextrin | 20 | Glutaric acid | 30.0 | 5.0 | AE100 | 1 |
| First liquid composition 15 | Methyl-β-cyclodextrin | 25 | Glutaric acid | 20.0 | 5.0 | AE100 | 1 |
| First liquid composition 16 | Methyl-β-cyclodextrin | 20 | Glutaric acid | 20.0 | 5.0 | AE100 | 1 |
| First liquid composition 17 | Methyl-β-cyclodextrin | 2 | Glutaric acid | 20.0 | 5.0 | AE100 | 1 |
| First liquid composition 18 | — | — | Glutaric acid | 30.0 | 5.0 | F444 | 5 |

Formation of Image

An image forming apparatus having the structure shown in FIG. 1 was used to perform high-speed printing at 1 m/s. In FIG. 1, a recording medium 1 is conveyed in the arrow direction along a conveyance stage 3 by a conveyance mechanism (not illustrated). To the recording medium 1, a liquid composition is applied with a coating roller (or a liquid ejecting head) 4 which is a liquid composition application unit. Then, the recording medium 1 is further conveyed toward the downstream side (in the arrow direction), and an ink is applied with a liquid ejecting head 5. More specifically, a liquid composition was applied on a recording medium 1 with a roller (or a liquid ejecting head) 4 which is a liquid composition application unit while the recording medium 1 was being conveyed. Next, an ink was applied to the recording medium at a downstream site of the liquid composition application unit 4 and an image was formed.

Images were recorded by the procedure described later, and the occurrence of image shift and the variation in dot size were observed to evaluate the image quality of the images.

For the above-mentioned image recorder, the condition in which 3.0 ng of ink droplets is applied to a unit area of $\frac{1}{1,200}$ inch×$\frac{1}{1,200}$ inch at a resolution of 1,200 dpi×1,200 dpi is defined as a recording duty of 100%.

The evaluation results are shown in Table 4-1 and Table 4-2, For Examples 25 to 50 and Comparative Examples 4 to 6, the mass ratios of the water-soluble resin amount relative to the inclusion compound amount and the mass ratios of the anionic water-soluble resin amount relative to the resin particle amount are shown in Table 5-1. In Table 5-1, the inclusion compound amount means the inclusion compound amount on a recording medium calculated from the coating amount of a liquid composition. The water-soluble resin amount is the anionic water-soluble resin amount on a recording medium when an ink is applied at a duty of 300%.

In the present invention, an image having at least one rank 'C' in the following evaluations of the variation in dot size and the occurrence of image shift had low image quality and was regarded as an unacceptable level.

[1] Examples 1 to 50, Comparative Examples 1to 6 (Direct Drawing Type Image Recording Method)

The liquid compositions and the inks obtained in the above were filled in ink cartridges, and the cartridges were installed in a direct drawing type image recorder according to the combinations shown in Tables 4-1 and 4-2.

Evaluation of Variation in Dot Size

By using the image recorder, each of the first liquid compositions obtained in the above was first applied to a recording medium, Pearl Coat (manufactured by Mitsubishi Paper Mills Co.) with a coating roller. The coating amounts and the ejecting amounts of the respective first liquid compositions are as shown in Table 4-1 and Table 4-2. In Table 4-1 to Table 4-6, "coating" in the application method of the liquid composition means that a liquid composition was applied with a coating roller, and "ejecting" means that a liquid composition was applied with a liquid ejecting head.

To the recording medium to which the first liquid composition had been applied, the cyan ink was then ejected from an ink jet recording head to record an image (solid image of 5 cm×5 cm) with a recording duty of 100%. Next, to the area in which the solid image of the cyan ink had been recorded and to the area in which the first liquid composition had been applied but no solid image of the cyan ink had been recorded, the black ink was applied.

The evaluation method was such that the dot size 1 of the black ink in the area without the cyan ink and the dot size 2 of the black ink in the area with the cyan ink were measured to calculate the dot size ratio.

Dot size ratio=|100−(dot size 2/dot size 1×100)|

The evaluation criteria are as shown below. The evaluation results are shown in Tables 4-1 and 4-2.

A: The dot size ratio is less than 10, and the image quality is good.

B: The dot size ratio is not less than 10 and less than 20, and an image can be formed.

C: The dot size ratio is 20 or more, and no image can be formed.

Evaluation of Image Shift

By using the above image recorder, the first liquid composition obtained in the above was applied to a recording medium with a coating roller or a liquid ejecting head. The coating amounts or the ejecting amounts are as shown in Table 4-1 and Table 4-2.

Next, to the recording medium to which the first liquid composition had been applied, the cyan, ink, the magenta ink, and the black ink were applied to form a corresponding color solid image with a duty of 300% in an area of 5 cm×5 cm. The evaluation, was performed by observing the solid image formation state with a microscope. If image shift occurs, color skipping occurs in a solid image. The evaluation criteria are as shown below. The evaluation results are shown in Tables 4-1 and 4-2.

A: A good solid image without color skipping

B: A usable image with partial color skipping

C: Color skipping is observed, and no solid image can be formed.

TABLE 4-1

| | Liquid composition | | | | | | Evaluation | |
|---|---|---|---|---|---|---|---|---|
| | First liquid composition | Application method | Application amount | Black ink | Cyan ink | Magenta ink | Dot size variation | Image shift |
| Example 1 | First liquid composition 1 | Coating | 1 g/m² | Ink 1A | Ink 1B | Ink 1C | A | A |
| Example 2 | First liquid composition 1 | Coating | 1 g/m² | Ink 2A | Ink 2B | Ink 2C | A | A |
| Example 3 | First liquid composition 1 | Coating | 1 g/m² | Ink 3A | Ink 3B | Ink 3C | A | A |
| Example 4 | First liquid composition 1 | Coating | 1 g/m² | Ink 4A | Ink 4B | Ink 4C | A | A |
| Example 5 | First liquid composition 1 | Coating | 1 g/m² | Ink 5A | Ink 5B | Ink 5C | A | A |
| Example 6 | First liquid composition 1 | Coating | 1 g/m² | Ink 6A | Ink 6B | Ink 6C | A | A |
| Example 7 | First liquid composition 1 | Coating | 1 g/m² | Ink 7A | Ink 7B | Ink 7C | A | A |
| Example 8 | First liquid composition 1 | Coating | 1 g/m² | Ink 8A | Ink 8B | Ink 8C | A | A |
| Example 9 | First liquid composition 1 | Coating | 1 g/m² | Ink 9A | Ink 9B | Ink 9C | A | B |
| Example 10 | First liquid composition 1 | Coating | 1 g/m² | Ink 10A | Ink 10B | Ink 10C | B | B |
| Example 11 | First liquid composition 1 | Coating | 1 g/m² | Ink 11A | Ink 11B | Ink 11C | A | A |
| Example 12 | First liquid composition 1 | Coating | 1 g/m² | Ink 12A | Ink 12B | Ink 12C | A | A |
| Example 13 | First liquid composition 1 | Coating | 1 g/m² | Ink 13A | Ink 13B | Ink 13C | A | A |
| Example 14 | First liquid composition 1 | Coating | 1 g/m² | Ink 14A | Ink 14B | Ink 14C | A | A |
| Example 15 | First liquid composition 1 | Coating | 1 g/m² | Ink 15A | Ink 15B | Ink 15C | B | A |
| Example 16 | First liquid composition 1 | Coating | 1 g/m² | Ink 16A | Ink 16B | Ink 16C | A | A |
| Example 17 | First liquid composition 1 | Coating | 1 g/m² | Ink 17A | Ink 17B | Ink 17C | A | A |
| Example 18 | First liquid composition 1 | Coating | 1 g/m² | Ink 18A | Ink 18B | Ink 18C | A | B |
| Example 19 | First liquid composition 1 | Coating | 1 g/m² | Ink 19A | Ink 19B | Ink 19C | B | A |
| Example 20 | First liquid composition 1 | Coating | 1 g/m² | Ink 20A | Ink 20B | Ink 20C | A | A |
| Example 21 | First liquid composition 1 | Coating | 1 g/m² | Ink 21A | Ink 21B | Ink 21C | A | A |
| Example 22 | First liquid composition 1 | Coating | 1 g/m² | Ink 22A | Ink 22B | Ink 22C | A | B |
| Example 23 | First liquid composition 2 | Coating | 1 g/m² | Ink 1A | Ink 1B | Ink 1C | A | A |
| Example 24 | First liquid composition 1 | Ejecting | 25% duty | Ink 1A | Ink 1B | Ink 1C | A | A |
| Comparative Example 1 | First liquid composition 1 | Coating | 1 g/m² | Ink 30A | Ink 30B | Ink 30C | A | C |
| Comparative Example 2 | First liquid composition 1 | Coating | 1 g/m² | Ink 31A | Ink 31B | Ink 31C | C | A |
| Comparative Example 3 | First liquid composition 1 | Coating | 1 g/m² | Ink 32A | Ink 32B | Ink 32C | C | A |

TABLE 4-2

| | Liquid composition | | | | | | Evaluation | |
|---|---|---|---|---|---|---|---|---|
| | First liquid composition | Application method | Application amount | Black ink | Cyan ink | Magenta ink | Dot size variation | Image shift |
| Example 25 | First liquid composition 3 | Coating | 1 g/m² | Ink 23A | Ink 23B | Ink 23C | A | A |
| Example 26 | First liquid composition 3 | Coating | 1 g/m² | Ink 26A | Ink 26B | Ink 26C | A | A |
| Example 27 | First liquid composition 3 | Coating | 1 g/m² | Ink 27A | Ink 27B | Ink 27C | A | A |
| Example 28 | First liquid composition 3 | Coating | 1 g/m² | Ink 28A | Ink 28B | Ink 28C | A | A |
| Example 29 | First liquid composition 3 | Coating | 1 g/m² | Ink 29A | Ink 29B | Ink 29C | A | A |

TABLE 4-2-continued

| | First liquid composition | Application method | Application amount | Black ink | Cyan ink | Magenta ink | Dot size variation | Image shift |
|---|---|---|---|---|---|---|---|---|
| Example 30 | First liquid composition 3 | Coating | 1 g/m² | Ink 30A | Ink 30B | Ink 30C | B | A |
| Example 31 | First liquid composition 3 | Coating | 1 g/m² | Ink 31A | Ink 31B | Ink 31C | A | A |
| Example 32 | First liquid composition 3 | Coating | 1 g/m² | Ink 32A | Ink 32B | Ink 32C | B | A |
| Example 33 | First liquid composition 3 | Coating | 1 g/m² | Ink 33A | Ink 33B | Ink 33C | A | A |
| Example 34 | First liquid composition 3 | Ejecting | 25% duty | Ink 23A | Ink 23B | Ink 23C | A | A |
| Example 35 | First liquid composition 3 | Coating | 1 g/m² | Ink 1A | Ink 1B | Ink 1C | A | A |
| Example 36 | First liquid composition 4 | Coating | 1 g/m² | Ink 23A | Ink 23B | Ink 23C | A | A |
| Example 37 | First liquid composition 5 | Coating | 1 g/m² | Ink 23A | Ink 23B | Ink 23C | A | A |
| Example 38 | First liquid composition 6 | Coating | 1 g/m² | Ink 23A | Ink 23B | Ink 23C | A | A |
| Example 39 | First liquid composition 7 | Coating | 1 g/m² | Ink 23A | Ink 23B | Ink 23C | A | A |
| Example 40 | First liquid composition 8 | Coating | 10 g/m² | Ink 23A | Ink 23B | Ink 23C | A | B |
| Example 41 | First liquid composition 9 | Coating | 2 g/m² | Ink 23A | Ink 23B | Ink 23C | B | B |
| Example 42 | First liquid composition 10 | Coating | 10 g/m² | Ink 23A | Ink 23B | Ink 23C | A | A |
| Example 43 | First liquid composition 11 | Coating | 10 g/m² | Ink 23A | Ink 23B | Ink 23C | A | A |
| Example 44 | First liquid composition 12 | Coating | 10 g/m² | Ink 23A | Ink 23B | Ink 23C | A | A |
| Example 45 | First liquid composition 13 | Coating | 1 g/m² | Ink 23A | Ink 23B | Ink 23C | A | A |
| Example 46 | First liquid composition 14 | Coating | 1 g/m² | Ink 23A | Ink 23B | Ink 23C | A | A |
| Example 47 | First liquid composition 15 | Coating | 25 g/m² | Ink 23A | Ink 23B | Ink 23C | B | A |
| Example 48 | First liquid composition 16 | Coating | 20 g/m² | Ink 23A | Ink 23B | Ink 23C | A | A |
| Example 49 | First liquid composition 17 | Coating | 2 g/m² | Ink 34A | Ink 34B | Ink 34C | A | A |
| Example 50 | First liquid composition 17 | Coating | 2 g/m² | Ink 35A | Ink 35B | Ink 35C | A | B |
| Comparative Example 4 | First liquid composition 1 | Coating | 1 g/m² | Ink 23A | Ink 23B | Ink 23C | A | C |
| Comparative Example 5 | First liquid composition 3 | Coating | 1 g/m² | Ink 36A | Ink 36B | Ink 36C | C | B |
| Comparative Example 6 | First liquid composition 3 | Coating | 1 g/m² | Ink 37A | Ink 37B | Ink 37C | C | B |

For Examples 25 to 50 and Comparative Examples 4 to 6, the mass ratios of the water-soluble resin amount relative to the inclusion compound amount and the mass ratios of the anionic water-soluble resin amount relative to the resin particle amount are shown in Table 5-1. In Table 5-1, the inclusion compound amount means the inclusion compound amount on a recording medium calculated from the coating amount of a liquid composition. The water-soluble resin amount means the anionic water-soluble resin amount on a recording medium when an ink is applied at a duty of 300%.

TABLE 5-1

| | Anionic water-soluble resin/ inclusion compound | Anionic water-soluble resin/ resin particles |
|---|---|---|
| Example 25 | 2 | 0.2 |
| Example 26 | 2 | 0.2 |
| Example 27 | 2.8 | 0.28 |
| Example 28 | 2.4 | 0.24 |
| Example 29 | 0.2 | 0.02 |
| Example 30 | 20 | 35 |
| Example 31 | 2 | 30 |
| Example 32 | 2 | 0.01 |
| Example 33 | 2 | 0.2 |
| Example 34 | 1.20 | 0.2 |
| Example 35 | 2 | 0.2 |
| Example 36 | 2 | 0.2 |
| Example 37 | 2 | 0.2 |
| Example 38 | 2 | 0.2 |
| Example 39 | 2 | 0.2 |
| Example 40 | 4 | 0.2 |
| Example 41 | 2 | 0.2 |
| Example 42 | 0.4 | 0.2 |
| Example 43 | 4 | 0.2 |
| Example 44 | 0.4 | 0.2 |
| Example 45 | 2 | 0.2 |

TABLE 5-1-continued

|  | Anionic water-soluble resin/ inclusion compound | Anionic water-soluble resin/ resin particles |
|---|---|---|
| Example 46 | 2 | 0.2 |
| Example 47 | 0.05 | 0.2 |
| Example 48 | 0.07 | 0.2 |
| Example 49 | 30 | 0.6 |
| Example 50 | 32.5 | 0.65 |
| Comparative Example 4 | — | 0.2 |
| Comparative Example 5 | — | — |
| Comparative Example 6 | 1.6 | — |

[2] Examples 51 to 72, Comparative Examples 7 to 11 (Intermediate Transfer Type Image Recording Method)

First, an intermediate transfer member was prepared by the following procedure. The intermediate transfer member had a two-layer structure composed of a support member and a surface layer member. As the support member of the intermediate transfer member, a flat plate made of aluminum alloy was used for this structure in consideration of required characteristics such as the rigidity capable of withstanding the pressure during transfer and dimensional accuracy. As the surface layer member of the intermediate transfer member, a siloxane compound surface layer was formed from a hydrolyzable organic silicon compound as the raw material by the following procedure. Glycidoxypropyltriethoxysilane and methyltriethoxysilane were mixed at a molar ratio of 1:1. To the mixture, hydrochloric acid was added as a catalyst, and the resulting mixture in an aqueous solvent was heated and refluxed for 24 hours or more, giving a hydrolyzable condensate solution. The hydrolyzable condensate solution was diluted with methyl isobutyl ketone to 10 to 20% by mass, and a photocationic polymerization initiator SP150 (manufactured by ADEKA CO.) was added at 5% by mass relative to the solid content, giving an intended coating solution. Next, the coating solution with the above formulation was used to form a film on the support member by spin coating. As a pretreatment of the support member, the surface was subjected to plasma treatment to improve the coating properties and the adhesion to the surface layer. Next, a UV lamp was used to irradiate the film, and the film was heated at 130° C. for 3 hours, giving a cured product. At this time, the surface layer of the cured product had a film thickness of about 0.3 μm.

The first liquid compositions and the inks obtained in the above were filled in ink cartridges, and the cartridges were installed in an intermediate transfer type image recorder (FIG. 2) using the above-described intermediate transfer member according to the combinations shown in Tables 4-3 and 4-4.

Evaluation of Variation in Dot Size

By using the intermediate transfer type image recorder, each of the first liquid compositions obtained in the above was first applied to the intermediate transfer member with a coating roller. The coating amounts and the ejecting amounts of the respective first liquid compositions are as shown in Table 4-3 and Table 4-4.

To the intermediate transfer member to which the first liquid composition had been applied, the cyan ink was then ejected from an ink jet recording head to record an image (solid image of 5 cm×5 cm) with a recording duty of 100%. Next, to the area in which the solid image of the cyan ink had been recorded and to the area in which the first liquid composition had been applied but no solid image of the cyan ink had been recorded, the black ink was applied.

The evaluation method is such that the dot size 1 of the black ink in the area without the cyan ink and the dot size 2 of the black ink in the area with the cyan ink were measured to calculate the dot size ratio.

Dot size ratio=|100−(dot size 2/dot size 1×100)|

The evaluation criteria are as shown below. The evaluation results are shown in Tables 4-3 and 4-4.

A: The dot size ratio is less than 10, and the image quality is good.

B: The dot size ratio is not less than 10 and less than 20, and an image can be formed.

C: The dot size ratio is 20 or more, and no image can be formed.

Evaluation of Image Shift

By using the above image recorder, the first liquid composition obtained in the above was applied, to the intermediate transfer member with a coating roller or a liquid ejecting head. The coating amounts or the ejecting amounts are as shown in Table 4-3 and Table 4-4.

Next, to the intermediate transfer member to which the first liquid composition had been applied, the cyan ink, the magenta ink, and the black ink were applied to form a corresponding color solid image with a duty of 300% in an area of 5 cm×5 cm. The evaluation was performed by observing the solid image formation state with a microscope. If image shift occurs, color skipping occurs in a solid image. The criteria are as shown below. The evaluation results are shown in Tables 4-3 and 4-4.

A: A good solid image without color skipping

B: A usable image with partial color skipping

C: Color skipping is observed, and no solid image can be formed.

TABLE 4-3

|  |  | Liquid composition | | | | | Evaluation | |
|---|---|---|---|---|---|---|---|---|
|  | First liquid composition | Application method | Application amount | Black ink | Cyan ink | Magenta ink | Dot size variation | Image shift |
| Example 51 | First liquid composition 18 | Coating | 1 g/m² | Ink 1A | Ink 1B | Ink 1C | A | A |
| Example 52 | First liquid composition 18 | Coating | 1 g/m² | Ink 3A | Ink 3B | Ink 3C | A | A |
| Example 53 | First liquid composition 18 | Coating | 1 g/m² | Ink 9A | Ink 9B | Ink 9C | A | B |
| Example 54 | First liquid composition 18 | Coating | 1 g/m² | Ink 15A | Ink 15B | Ink 15C | B | A |
| Example 55 | First liquid composition 18 | Coating | 1 g/m² | Ink 16A | Ink 16B | Ink 16C | A | A |
| Example 56 | First liquid composition 18 | Coating | 1 g/m² | Ink 17A | Ink 17B | Ink 17C | A | A |
| Example 57 | First liquid composition 18 | Coating | 1 g/m² | Ink 18A | Ink 18B | Ink 18C | A | B |

TABLE 4-3-continued

| | Liquid composition | | | | | Evaluation | |
|---|---|---|---|---|---|---|---|
| | First liquid composition | Application method | Application amount | Black ink | Cyan ink | Magenta ink | Dot size variation | Image shift |
| Example 58 | First liquid composition 18 | Coating | 1 g/m² | Ink 19A | Ink 19B | Ink 19C | B | A |
| Example 59 | First liquid composition 18 | Coating | 1 g/m² | Ink 20A | Ink 20B | Ink 20C | A | A |
| Example 60 | First liquid composition 18 | Coating | 1 g/m² | Ink 21A | Ink 21B | Ink 21C | A | A |
| Example 61 | First liquid composition 18 | Coating | 1 g/m² | Ink 22A | Ink 22B | Ink 22C | A | B |
| Example 62 | First liquid composition 1 | Coating | 1 g/m² | Ink 1A | Ink 1B | Ink 1C | A | A |
| Example 63 | First liquid composition 2 | Coating | 1 g/m² | Ink 1A | Ink 1B | Ink 1C | A | A |
| Comparative Example 7 | First liquid composition 18 | Coating | 1 g/m² | Ink 23A | Ink 23B | Ink 23C | A | C |
| Comparative Example 8 | First liquid composition 18 | Coating | 1 g/m² | Ink 24A | Ink 24B | Ink 24C | C | A |
| Comparative Example 9 | First liquid composition 18 | Coating | 1 g/m² | Ink 25A | Ink 25B | Ink 25C | C | A |

TABLE 4-4

| | Liquid composition | | | | | Evaluation | |
|---|---|---|---|---|---|---|---|
| | First liquid composition | Application method | Application amount | Black ink | Cyan ink | Magenta ink | Dot size variation | Image shift |
| Example 64 | First liquid composition 3 | Coating | 1 g/m² | Ink 23 | Ink 23 | Ink 23 | A | A |
| Example 65 | First liquid composition 3 | Coating | 1 g/m² | Ink 27 | Ink 27 | Ink 27 | A | A |
| Example 66 | First liquid composition 7 | Coating | 1 g/m² | Ink 23 | Ink 23 | Ink 23 | A | A |
| Example 67 | First liquid composition 8 | Coating | 1 g/m² | Ink 23 | Ink 23 | Ink 23 | A | B |
| Example 68 | First liquid composition 10 | Coating | 1 g/m² | Ink 23 | Ink 23 | Ink 23 | A | A |
| Example 69 | First liquid composition 15 | Coating | 1 g/m² | Ink 23 | Ink 23 | Ink 23 | B | A |
| Example 70 | First liquid composition 16 | Coating | 1 g/m² | Ink 23 | Ink 23 | Ink 23 | A | A |
| Example 71 | First liquid composition 17 | Coating | 1 g/m² | Ink 34 | Ink 34 | Ink 34 | A | A |
| Example 72 | First liquid composition 17 | Coating | 1 g/m² | Ink 35 | Ink 35 | Ink 35 | A | B |
| Comparative Example 10 | First liquid composition 3 | Coating | 1 g/m² | Ink 36A | Ink 36B | Ink 36C | C | B |
| Comparative Example 11 | First liquid composition 3 | Coating | 1 g/m² | Ink 37A | Ink 37B | Ink 37C | C | B |

For Examples 64 to 72 and Comparative Examples 10 and 11, the mass ratios of the water-soluble resin amount relative to the inclusion compound amount, and the mass ratios of the anionic water-soluble resin amount relative to the resin particle amount are shown in Table 5-2. In Table 5-2, the inclusion compound amount means the inclusion compound amount on a recording medium calculated from the coating amount of a liquid composition. The water-soluble resin amount is the anionic water-soluble resin amount on a recording medium, when an ink is applied at a duty of 300%.

TABLE 5-2

| | Anionic water-soluble resin/ inclusion compound | Anionic water-soluble resin/ resin particles |
|---|---|---|
| Example 64 | 2 | 0.2 |
| Example 65 | 2.8 | 0.28 |
| Example 66 | 2 | 0.2 |
| Example 67 | 4 | 0.2 |
| Example 68 | 0.4 | 0.2 |
| Example 69 | 0.05 | 0.2 |
| Example 70 | 0.07 | 0.2 |
| Example 71 | 30 | 6 |
| Example 72 | 32.5 | 6.5 |
| Comparative Example 10 | — | — |
| Comparative Example 11 | 1.6 | — |

[3] Examples 73 to 77 (Intermediate Transfer Type Image Recording Method)

The liquid compositions and the inks obtained in the above were filled in ink cartridges, and the cartridges were installed in an intermediate transfer type image recorder according to the combinations shown in Table 4-5.

In Examples 73 and 74, the variation in dot size and the image shift were evaluated in the same manner as in Example 52. The evaluation results are shown in Table 4-5.

TABLE 4-5

| | First liquid composition | Application method | Application amount | Black ink | Cyan ink | Magenta ink | Dot size variation | Image shift |
|---|---|---|---|---|---|---|---|---|
| Example 73 | Liquid composition of first liquid composition 18 | Coating | 1 g/m² | Ink 38A | Ink 38B | Ink 38C | A | A |
| Example 74 | Liquid composition of first liquid composition 18 | Coating | 1 g/m² | Ink 39A | Ink 39B | Ink 39C | A | A |

In Examples 75 to 77, the image shift was evaluated by using each ink used in Examples 52, 73, and 74. In Examples 75 to 77, the image shift was evaluated in the same manner as in Examples 52, 73, and 74 except that the duty was changed from 300% to 600%. The evaluation results are shown in Table 4-6.

TABLE 4-6

| | First liquid composition | Application method | Application amount | Black ink | Cyan ink | Magenta ink | Evaluation of image shift |
|---|---|---|---|---|---|---|---|
| Example 75 | Liquid composition of first liquid composition 18 | Coating | 1 g/m² | Ink 3A | Ink 3B | Ink 3C | B |
| Example 76 | Liquid composition of first liquid composition 18 | Coating | 1 g/m² | Ink 38A | Ink 38B | Ink 38C | B |
| Example 77 | Liquid composition of first liquid composition 18 | Coating | 1 g/m² | Ink 39A | Ink 39B | Ink 39C | A |

Second Liquid Compositions 1 to 16

An inclusion compound, an anionic water-soluble resin, a resin particle dispersion, glycerol, Acetylenol E 100 (also referred to as AE 100), and ion-exchanged water were mixed in accordance with the formulations in Table 6. The mixtures were thoroughly stirred, and subjected to pressure filtration through a microfilter with a pore size of 3.0 μm (manufactured by Fujifiim Corporation), giving liquid compositions 1 to 16 as the second liquid composition. The remainder of ion-exchanged water is such an amount that the total amount of all the components constituting the second liquid composition becomes 100.0% by mass.

In Table 6, the content of the resin particle dispersion represents the content rate of the resin particles relative to the total amount of the second liquid composition 15.

TABLE 6

| | Inclusion compound | | Water-soluble resin | | | Resin particle dispersion | | Glycerol | AE100 | |
|---|---|---|---|---|---|---|---|---|---|---|
| Second liquid composition | Type | Content (% by mass) | Type | Content (% by mass) | Water-soluble resin/inclusion compound | Type | Content (% by mass) | Content (% by mass) | Content (% by mass) | Water Content |
| Second liquid composition 1 | α-Cyclodextrin | 2.0 | Water-soluble resin 1 | 10.0 | 5 | — | | 7.0 | 0.3 | Remainder |
| Second liquid composition 2 | α-Cyclodextrin | 2.0 | Water-soluble resin 2 | 10.0 | 5 | — | | 7.0 | 0.3 | Remainder |

TABLE 6-continued

| Second liquid composition | Inclusion compound Type | Content (% by mass) | Water-soluble resin Type | Content (% by mass) | Water-soluble resin/inclusion compound | Resin particle dispersion Type | Content (% by mass) | Glycerol Content (% by mass) | AE100 Content (% by mass) | Water Content |
|---|---|---|---|---|---|---|---|---|---|---|
| Second liquid composition 3 | α-Cyclodextrin | 2.0 | Water-soluble resin 3 | 10.0 | 5 | — | | 7.0 | 0.3 | Remainder |
| Second liquid composition 4 | 4-Sulfocalix[6]arene | 2.0 | Water-soluble resin 1 | 10.0 | 5 | — | | 7.0 | 0.3 | Remainder |
| Second liquid composition 5 | Bovine serum albumin | 2.0 | Water-soluble resin 1 | 10.0 | 5 | — | | 7.0 | 0.3 | Remainder |
| Second liquid composition 6 | β-Cyclodextrin | 0.5 | Water-soluble resin 1 | 10.0 | 20 | — | | 7.0 | 0.3 | Remainder |
| Second liquid composition 7 | γ-Cyclodextrin | 2.0 | Water-soluble resin 1 | 10.0 | 5 | — | | 7.0 | 0.3 | Remainder |
| Second liquid composition 8 | Methyl-β-cyclodextrin | 40.0 | Water-soluble resin 1 | 2.0 | 0.05 | — | | 7.0 | 0.3 | Remainder |
| Second liquid composition 9 | Methyl-β-cyclodextrin | 5.0 | Water-soluble resin 4 | 10.0 | 2.00 | — | | 7.0 | 0.3 | Remainder |
| Second liquid composition 10 | γ-Cyclodextrin | 2.0 | Water-soluble resin 5 | 5.0 | 2.50 | — | | 7.0 | 0.3 | Remainder |
| Second liquid composition 11 | Hydroxypropyl-β-cyclodextrin | 35.0 | Water-soluble resin 1 | 2.5 | 0.07 | — | | 7.0 | 0.3 | Remainder |
| Second liquid composition 12 | Maltosyl-β-cyclodextrin | 10.0 | Water-soluble resin 1 | 10.0 | 1.00 | — | | 7.0 | 0.3 | Remainder |
| Second liquid composition 13 | α-Cyclodextrin | 0.5 | Water-soluble resin 1 | 15.0 | 30 | — | | 7.0 | 0.3 | Remainder |
| Second liquid composition 14 | α-Cyclodextrin | 0.8 | Water-soluble resin 1 | 30.0 | 40 | — | | 7.0 | 0.3 | Remainder |
| Second liquid composition 15 | α-Cyclodextrin | 2.0 | Water-soluble resin 1 | 0.3 | 0.2 | Resin particle dispersion 1 | 10 | 7.0 | 0.3 | Remainder |
| Second liquid composition 16 | — | — | Water-soluble resin 1 | 2.0 | — | — | | 7.0 | 0.3 | Remainder |

For the second liquid compositions 1 to 16, the mass ratios of the anionic water-soluble resin amount relative to the inclusion compound amount are shown in Table 7.

TABLE 7

| Second liquid composition | Water-soluble resin/inclusion compound |
|---|---|
| Second liquid composition 1 | 5 |
| Second liquid composition 2 | 5 |
| Second liquid composition 3 | 5 |
| Second liquid composition 4 | 5 |
| Second liquid composition 5 | 5 |
| Second liquid composition 6 | 20 |
| Second liquid composition 7 | 5 |
| Second liquid composition 8 | 0.05 |
| Second liquid composition 9 | 2.00 |
| Second liquid composition 10 | 2.50 |
| Second liquid composition 11 | 0.07 |
| Second liquid composition 12 | 1.00 |
| Second liquid composition 13 | 30 |
| Second liquid composition 14 | 40 |
| Second liquid composition 15 | 0.2 |
| Second liquid composition 16 | — |

Formation of Image

Images were recorded by the procedure described later, and the occurrence of image cracking was observed to evaluate the image quality of the images.

The evaluation results are shown in Table 8-1. In the present invention, an image having rank 'C' in the evaluation of image cracking had low image quality and was regarded as an unacceptable level.

[4] Examples 78 to 94, Comparative Example 12 (Direct Drawing Type Image Recording Method)

The first liquid compositions and the second liquid compositions were filled in cartridges, and the cartridges were installed in the direct drawing type image recorder illustrated in FIG. 1 according to the combinations shown in Table 8-1 and Table 8-2.

By using the above image recorder, the first liquid composition obtained in the above was first applied to a recording medium with a coating roller or a liquid ejecting head. The coating amounts and the ejecting amounts are as shown in Table 8-1. In Table 8-1, "coating" in the application method of the liquid composition means that a liquid composition was applied with a coating roller, and "ejecting" means that a liquid composition was applied with a liquid ejecting head.

Next, to the recording medium Pearl Coat (manufactured by Mitsubishi Paper Mills Co.) to which the first liquid composition had been applied, the second liquid composition was applied to form a solid image with a duty of 200% in an area of 5 cm×5 cm.

[5] Example 95 Direct Drawing Type Image Recording Method

The ink 23A (black ink), the ink 23B (cyan ink), the ink 23C (magenta ink), the first liquid composition 1, and the second liquid composition 1 were filled in cartridges, and the cartridges were installed in a direct, drawing type image recorder.

By using the image recorder, the first liquid composition obtained in the above was first applied to a recording medium Pearl Coat (manufactured by Mitsubishi Paper Mills Co.) with a coating roller.

Nest, to the recording medium face to which the first liquid composition had been applied, the cyan ink, the magenta ink, and the black ink were applied to form a corresponding color solid image with a duty of 300% in an area of 5 cm×5 cm. The second liquid composition was further ejected at a duty of 200% onto the image formed, with the inks, giving an image for evaluation.

Evaluation of Image Cracking

Image cracking was evaluated by observing the solid image formation state with a microscope. If image cracking occurs, cracking is observed with a microscope. The evaluation criteria are as shown below. The evaluation results are shown in Table 8-1.

A: A good solid image without crack
B: A usable image having cracking partly
C: An image with cracking in the whole area

[6] Examples 96 to 102, Comparative Example 13 (Intermediate Transfer Type Image Recording Method)

The same intermediate transfer member as used in Examples 51 to 72 and Comparative Examples 7 to 11 was prepared. The first liquid compositions and the second liquid compositions obtained in the above were filled in cartridges, and the cartridges were shown in Table 8-2 installed in the intermediate transfer type image recorder (FIG. 2) using the intermediate transfer member according to the combinations shown in Table 8-2.

By using the image recorder, the first liquid composition obtained in the above was first applied to the intermediate transfer member with a coating roller. The coating amounts and the ejecting amounts are as shown in Table 8-2. In Table 8-2, "coating" in the application method of the liquid composition means that a liquid composition was applied with a coating roller.

Nest, to the intermediate transfer member to which the first liquid composition had been applied, the second liquid composition was applied to form a solid image with a duty of 200% in an area of 5 cm×5 cm.

Evaluation of Image Cracking

Image cracking was evaluated by observing the solid image formation state with a microscope. If image cracking occurs, cracking is observed, with a microscope. The evaluation criteria are as shown below. The evaluation results are shown in Table 8-2.

TABLE 8-1

|  | Liquid composition | | | | Evaluation |
| --- | --- | --- | --- | --- | --- |
|  | First liquid composition | Application method | Applicaton amount | Second liquid composition | Image cracking |
| Example 78 | First liquid composition 1 | Coating | 1 g/m² | Second liquid composition 1 | A |
| Example 79 | First liquid composition 1 | Coating | 1 g/m² | Second liquid composition 2 | A |
| Example 80 | First liquid composition 1 | Coating | 1 g/m² | Second liquid composition 3 | A |
| Example 81 | First liquid composition 1 | Coating | 1 g/m² | Second liquid composition 4 | A |
| Example 82 | First liquid composition 1 | Coating | 1 g/m² | Second liquid composition 5 | A |
| Example 83 | First liquid composition 1 | Coating | 1 g/m² | Second liquid composition 6 | A |
| Example 84 | First liquid composition 1 | Coating | 1 g/m² | Second liquid composition 7 | A |
| Example 85 | First liquid composition 1 | Coating | 1 g/m² | Second liquid composition 8 | B |
| Example 86 | First liquid composition 1 | Coating | 1 g/m² | Second liquid composition 9 | A |
| Example 87 | First liquid composition 1 | Coating | 1 g/m² | Second liquid composition 10 | A |
| Example 88 | First liquid composition 1 | Coating | 1 g/m² | Second liquid composition 11 | A |
| Example 89 | First liquid composition 1 | Coating | 1 g/m² | Second liquid composition 12 | A |
| Example 90 | First liquid composition 1 | Coating | 1 g/m² | Second liquid composition 13 | A |
| Example 91 | First liquid composition 1 | Coating | 1 g/m² | Second liquid composition 14 | B |
| Example 92 | First liquid composition 1 | Coating | 1 g/m² | Second liquid composition 15 | AA |
| Example 93 | First liquid composition 2 | Coating | 1 g/m² | Second liquid composition 1 | A |
| Example 94 | First liquid composition 1 | Ejecting | 25% duty | Second liquid composition 1 | A |
| Example 95 | First liquid composition 1 | Coating | 1 g/m² | Second liquid composition 1 | A |
| Comparative Example 12 | First liquid composition 1 | Coating | 1 g/m² | Second liquid composition 16 | C |

A: A good solid image without crack.
B: A usable image having cracking partly
C: An image with cracking in the whole area

TABLE 8-2

| | Liquid composition | | | Evaluation |
|---|---|---|---|---|
| | First liquid composition | Application method | Application amount | Second liquid composition | Image cracking |
| Example 96 | First liquid composition 18 | Coating | 1 g/m² | Second liquid composition 1 | A |
| Example 97 | First liquid composition 18 | Coating | 1 g/m² | Second liquid composition 8 | B |
| Example 98 | First liquid composition 18 | Coating | 1 g/m² | Second liquid composition 11 | A |
| Example 99 | First liquid composition 18 | Coating | 1 g/m² | Second liquid composition 13 | A |
| Example 100 | First liquid composition 18 | Coating | 1 g/m² | Second liquid composition 14 | B |
| Example 101 | First liquid composition 18 | Coating | 1 g/m² | Second liquid composition 15 | AA |
| Example 102 | First liquid composition 1 | Coating | 1 g/m² | Second liquid composition 1 | A |
| Comparative Example 13 | First liquid composition 18 | Coating | 1 g/m² | Second liquid composition 16 | C |

While the present invention has been described with, reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-024490, filed Feb. 10, 2015, and No. 2015-024449, filed Feb. 10, 2015, which are hereby incorporated by reference herein, in their entirety.

What is claimed is:

1. An image recording method comprising:
    an ink application step of applying an ink comprising a coloring material, an anionic water-soluble resin having an anionic group and a hydrophobic group, resin particles, an inclusion compound, and an aqueous medium to a recording medium; and
    a first liquid composition application step of applying a first liquid composition comprising at least one of an organic acid and a polyvalent metal ion to the recording medium so as to at least partly overlap with an area where the ink is applied,
    wherein the inclusion compound is at least one compound selected from the group consisting of an α-cyclodextrin, an α-cyclodextrin derivative, a β-cyclodextrin, a β-cyclodextrin derivative, a γ-cyclodextrin, and a γ-cyclodextrin derivative, and
    (i) when the inclusion compound is the α-cyclodextrin, the α-cyclodextrin derivative, the β-cyclodextrin, or the β-cyclodextrin derivative,
    the hydrophobic group is
        an alkyl group or a cycloalkyl group having 1 to 10 carbon atoms, or
        an aryl group or an aralkyl group having 6 to 7 carbon atoms, and
    (ii) when the inclusion compound is the γ-cyclodextrin or the γ-cyclodextrin derivative,
    the hydrophobic group is
        an alkyl group or a cycloalkyl group having 1 to 10 carbon atoms, or
        an aryl group or an aralkyl group having 6 to 15 carbon atoms.

2. The image recording method according to claim 1, wherein a mass ratio of a content of the anionic water-soluble resin (CAP) in the ink relative to a content of the inclusion compound (CI) in the ink, (CAP/CI), is 0.07 or more and 30 or less.

3. The image recording method according to claim 1, wherein a mass ratio of a content of the anionic water-soluble resin (CAP) in the ink relative to a content of the resin particles (CP) in the ink, (CAP/CP), is 0.02 or more and 30 or less.

4. A liquid set for image recording, the liquid set comprising:
    an ink comprising a coloring material, an anionic water-soluble resin having an anionic group and a hydrophobic group, resin particles, an inclusion compound, and an aqueous medium; and
    a first liquid composition comprising at least one of an organic acid and a polyvalent metal ion,
    wherein the inclusion compound is at least one compound selected from the group consisting of an α-cyclodextrin, an α-cyclodextrin derivative, a β-cyclodextrin, a β-cyclodextrin derivative, a γ-cyclodextrin, and a γ-cyclodextrin derivative, and
    (i) when the inclusion compound is the α-cyclodextrin, the α-cyclodextrin derivative, the β-cyclodextrin, or the β-cyclodextrin derivative,
    the hydrophobic group is
        an alkyl group or a cycloalkyl group having 1 to 10 carbon atoms, or
        an aryl group or an aralkyl group having 6 to 7 carbon atoms, and
    (ii) when the inclusion compound is the γ-cyclodextrin or the γ-cyclodextrin derivative,
    the hydrophobic group is
        an alkyl group or a cycloalkyl group having 1 to 10 carbon atoms, or
        an aryl group or an aralkyl group having 6 to 15 carbon atoms.

5. An image recording method comprising:
    an ink application step of applying an ink comprising a coloring material, an anionic water-soluble resin having an anionic group and a hydrophobic group, resin particles, and an aqueous medium to a recording medium; and a first liquid composition application step of applying a first liquid composition comprising at least one of an organic acid and a polyvalent metal ion and comprising an inclusion compound to the recording medium so as to at least partly overlap with an area where the ink is applied, wherein the inclusion compound is at least one compound selected from the group consisting of an α-cyclodextrin, an α-cyclodextrin derivative, a β-cyclodextrin, a β-cyclodextrin derivative, a γ-cyclodextrin, and a γ-cyclodextrin derivative, and (i) when the inclusion compound is the α-cyclodextrin, the α-cyclodextrin derivative, the β-cyclodextrin, or the β-cyclodextrin derivative, the hydrophobic group is
an alkyl group or a cycloalkyl group having 1 to 10 carbon atoms, or
an aryl group or an aralkyl group having 6 to 7 carbon atoms, and (ii) when the inclusion compound is the γ-cyclodextrin or the γ-cyclodextrin derivative, the hydrophobic group is
an alkyl group or a cycloalkyl group having 1 to 10 carbon atoms, or
an aryl group or an aralkyl group having 6 to 15 carbon atoms.

6. The image recording method according to claim 5, wherein a ratio of a mass of the inclusion compound (MI) in the first liquid composition applied to form an image relative to a mass of the anionic water-soluble resin (MA) in the ink calculated from an amount of the ink applied to form the image, (MA/MI), is 0.07 or more and 30 or less.

7. The image recording method according to claim 5, wherein a mass ratio of a content of the anionic water-soluble resin (CAP) in the ink relative to a content of the resin particles (CP) in the ink, (CAP/CP), is 0.02 or more and 30 or less.

8. A liquid set for image recording comprising:
an ink comprising a coloring material, an anionic water-soluble resin having an anionic group and a hydrophobic group, and an aqueous medium; and
a first liquid composition comprising at least one of an organic acid and a polyvalent metal ion and comprising an inclusion compound, wherein the inclusion compound is at least one compound selected from the group consisting of an α-cyclodextrin, an α-cyclodextrin derivative, a β-cyclodextrin, a β-cyclodextrin derivative, a γ-cyclodextrin, and a γ-cyclodextrin derivative, and (i) when the inclusion compound is the α-cyclodextrin, the α-cyclodextrin derivative, the β-cyclodextrin, or the β-cyclodextrin derivative, the hydrophobic group is
an alkyl group or a cycloalkyl group having 1 to 10 carbon atoms, or
an aryl group or an aralkyl group having 6 to 7 carbon atoms, and (ii) when the inclusion compound is the γ-cyclodextrin or the γ-cyclodextrin derivative, the hydrophobic group is
an alkyl group or a cycloalkyl group having 1 to 10 carbon atoms, or
an aryl group or an aralkyl group having 6 to 15 carbon atoms.

9. An image recording method comprising:
an ink application step of applying an ink comprising a coloring material to a recording medium;

a first liquid composition application step of applying a first liquid composition comprising at least one of an organic acid and a polyvalent metal ion to the recording medium so as to at least partly overlap with an area where the ink is applied; and a second liquid composition application step of applying a second liquid composition comprising an anionic water-soluble resin having an anionic group and a hydrophobic group, an inclusion compound, and an aqueous medium to the recording medium so as to at least partly overlap with an area where the first liquid composition is applied, wherein the inclusion compound is at least one compound selected from the group consisting of an α-cyclodextrin, an α-cyclodextrin derivative, a β-cyclodextrin, a β-cyclodextrin derivative, a γ-cyclodextrin, and a γ-cyclodextrin derivative, and (i) when the inclusion compound is the α-cyclodextrin, the α-cyclodextrin derivative, the β-cyclodextrin, or the β-cyclodextrin derivative, the hydrophobic group is
an alkyl group or a cycloalkyl group having 1 to 10 carbon atoms, or
an aryl group or an aralkyl group having 6 to 7 carbon atoms, and (ii) when the inclusion compound is the γ-cyclodextrin or the γ-cyclodextrin derivative, the hydrophobic group is
an alkyl group or a cycloalkyl group having 1 to 10 carbon atoms, or
an aryl group or an aralkyl group having 6 to 15 carbon atoms.

10. The image recording method according to claim 9, wherein in the second liquid composition, a mass ratio of a content of the anionic water-soluble resin (CA) relative to a content of the inclusion compound (CI), (CA/CI), is 0.07 or more and 30 or less.

11. The image recording method according to claim 9, wherein the ink application step and the first liquid composition application step are performed, and then the second liquid composition application step is performed.

12. A liquid set for image recording comprising:
an ink comprising a coloring material;
a first liquid composition comprising at least one of an organic acid and a polyvalent metal ion; and
a second liquid composition comprising an anionic water-soluble resin having an anionic group and a hydrophobic group, an inclusion compound, and an aqueous medium, wherein the inclusion compound is at least one compound selected from the group consisting of an α-cyclodextrin, an α-cyclodextrin derivative, a β-cyclodextrin, a β-cyclodextrin derivative, a γ-cyclodextrin, and a γ-cyclodextrin derivative, and (i) when the inclusion compound is the α-cyclodextrin, the α-cyclodextrin derivative, the β-cyclodextrin, or the β-cyclodextrin derivative, the hydrophobic group is
an alkyl group or a cycloalkyl group having 1 to 10 carbon atoms, or
an aryl group or an aralkyl group having 6 to 7 carbon atoms, and (ii) when the inclusion compound is the γ-cyclodextrin or the γ-cyclodextrin derivative, the hydrophobic group is
an alkyl group or a cycloalkyl group having 1 to 10 carbon atoms, or an aryl group or an aralkyl group having 6 to 15 carbon atoms.

13. The image recording method according to claim 1, wherein the inclusion compound comprises at least one compound of a γ-cyclodextrin and a γ-cyclodextrin derivative.

14. The image recording method according to claim 1, wherein the anionic water-soluble resin has an acid value of 50 mg KOH/g or more.

* * * * *